(12) United States Patent
Fujii et al.

(10) Patent No.: US 8,166,630 B2
(45) Date of Patent: May 1, 2012

(54) MAGNETIC HEAD SLIDER MANUFACTURING METHOD

(75) Inventors: Ryuji Fujii, Hong Kong (CN); Ikuhito Onodera, Hong Kong (CN); Quan Bao Wang, Hong Kong (CN); Masahiro Kuribayashi, Hong Kong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 629 days.

(21) Appl. No.: 12/289,761

(22) Filed: Nov. 3, 2008

(65) Prior Publication Data

US 2009/0116149 A1  May 7, 2009

(30) Foreign Application Priority Data

Nov. 2, 2007 (CN) .......................... 2007 1 0170008
Dec. 25, 2007 (JP) ................................. 2007-331690

(51) Int. Cl.
*G11B 5/127* (2006.01)
*H04R 31/00* (2006.01)
(52) U.S. Cl. .................. 29/603.11; 360/321; 360/324.2; 29/603.13; 29/603.14; 29/603.15; 29/603.16; 29/603.18; 451/5; 451/8; 451/10; 451/28; 451/41
(58) Field of Classification Search ............... 29/603.11, 29/603.13–603.16, 603.18; 360/321, 324.2; 451/5, 8, 10, 28, 36, 37, 41
See application file for complete search history.

(56) References Cited

U.S. PATENT DOCUMENTS

| 5,708,370 A | * | 1/1998 | Shibata et al. | 324/699 |
| 6,884,148 B1 | * | 4/2005 | Dovek et al. | 451/5 |
| 7,712,205 B2 | * | 5/2010 | Ito et al. | 29/603.16 |

FOREIGN PATENT DOCUMENTS

| JP | 2006-172691 | 6/2006 |
| JP | 2006-331562 | 12/2006 |

* cited by examiner

*Primary Examiner* — Paul D Kim
(74) *Attorney, Agent, or Firm* — Nixon & Vanderhye P.C.

(57) ABSTRACT

To provide a manufacturing method which can adjust the lengths of a recording element and a reproducing element for enabling manufacture of high-quality magnetic head sliders. The manufacturing method comprises: a stacked-layer forming step which stacks magnetic heads on a substrate; a lapping step which cuts out a bar block having a plurality of connected magnetic head sliders, and polishes a flying surface; and a slider cutting step which cuts out individual magnetic head sliders from the bar block. The stacked-layer forming step forms a reproducing-element polish amount detecting sensor on a same layer as that of the reproducing element, and forms a recording-element polish amount detecting sensor on a same layer as that of the recording element. The lapping step carries out polishing based on each output value of the reproducing-element polish amount detecting sensor and the recording-element polish amount detecting sensor.

24 Claims, 29 Drawing Sheets

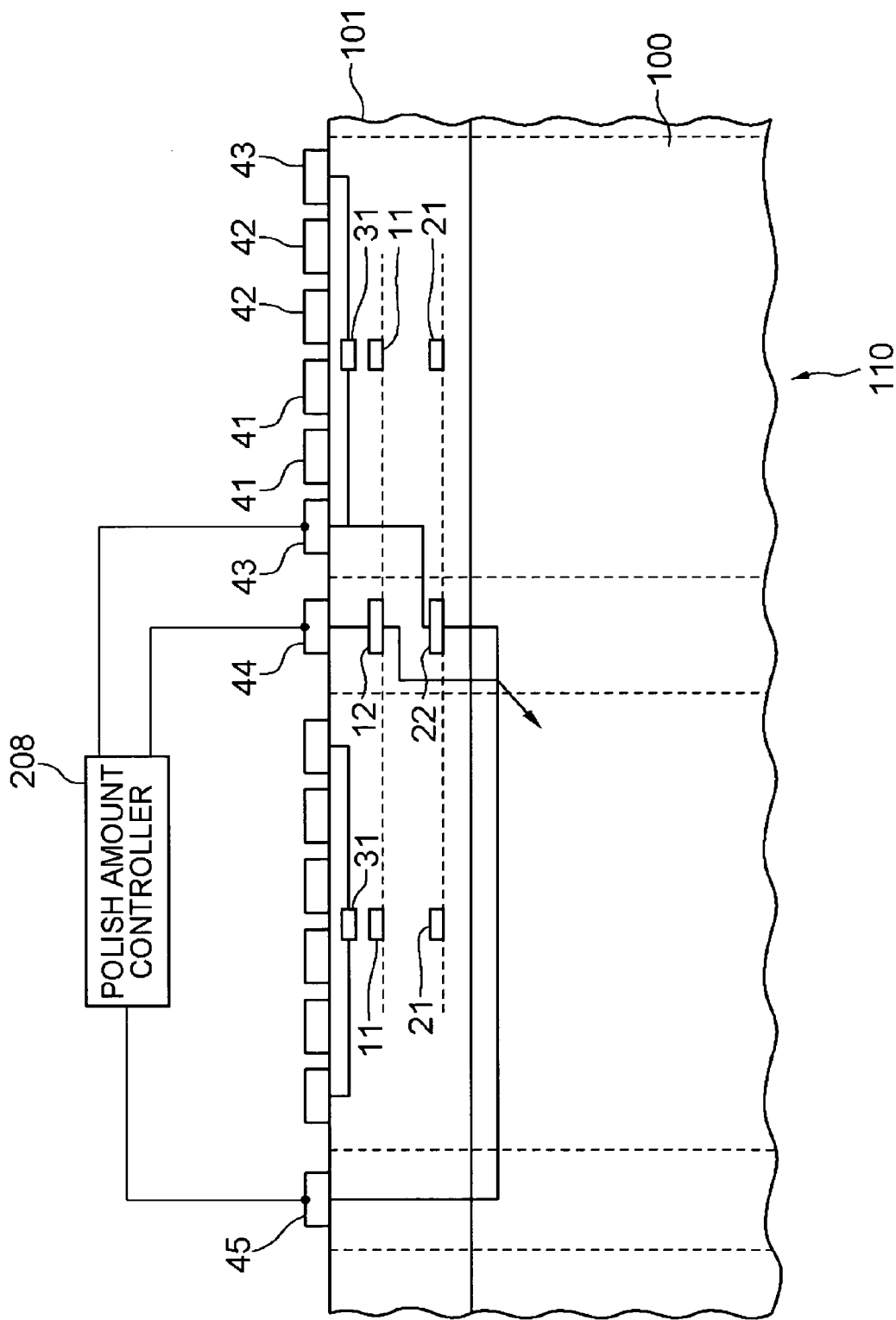

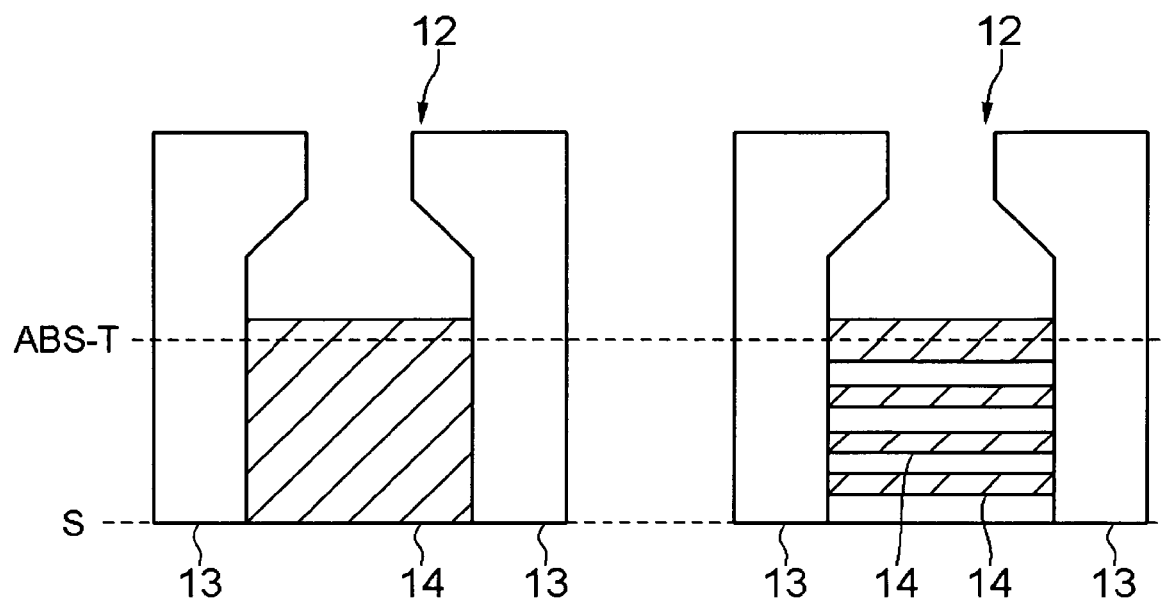

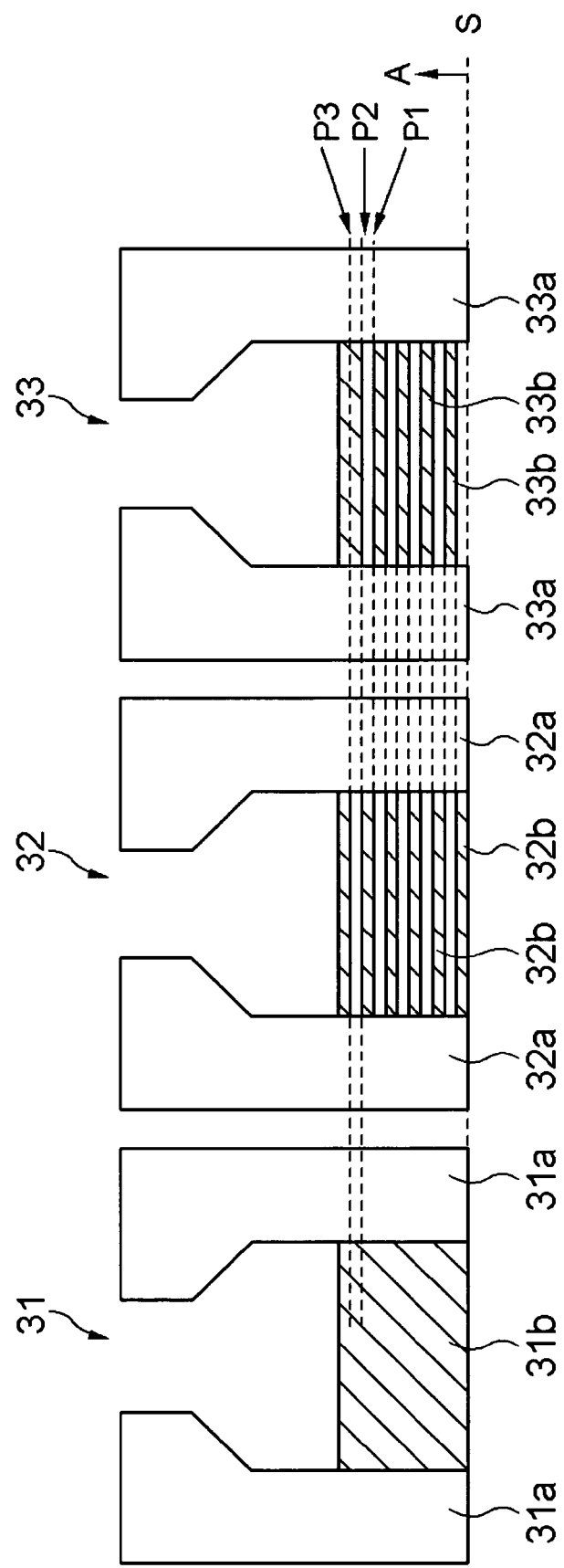

POLISHING TIME

POLISHING TIME

MAGNETIC HEAD SLIDER MANUFACTURING METHOD

This application claims priority to Chinese Application No. 200710170008.2, filed 2 Nov. 2007 and Japanese Application No. 2007-331690, filed 25 Dec. 2007, the entire contents of each of which are hereby incorporated by reference.

BACKGROUND OF THE INVENTION

1. Field of the Invention

The present invention relates to a magnetic head slider manufacturing method and, more specifically, to a method for manufacturing a magnetic head slider that has a magnetic head formed with thin films.

2. Description of the Related Art

Recent advancement in the recording density of magnetic disk devices has been remarkable, and it has continued to grow. So far, mainly employed is a recording method called a longitudinal recording method which places magnetic data horizontally with respect to a disk surface. With the longitudinal recording method, however, magnetic poles repel each other. Thus, it is difficult to have higher density. Even if it becomes possible to achieve higher density by suppressing repelling of the magnetic poles through thinning films of a recording medium, it is unavoidable to have an issue of heat disturbance with which the recording magnetization becomes unstable because of the heat energy of a room temperature. Therefore, recently, there has been achieved a perpendicular-recording type magnetic disk device with which the recording density can be improved further.

The perpendicular-recording method has such a characteristic that a diamagnetic field working between neighboring bits becomes reduced as the linear recording density is increased, and that the recording magnetism can be stably maintained. Thus, the higher the density becomes, the more the recording magnetism is stabilized. Therefore, it is effective as a technique for achieving super high-density recording. Specifically, the perpendicular recording method is a magnetic recording method which records information by applying a magnetic field to a recording layer sandwiched between a backing soft magnetic layer of a double-layered recording medium and a magnetic monopole head so as to magnetize the magnetic substance of the recording layer towards a direction perpendicular to the disk surface. With the perpendicular recording method, it is necessary to shorten the height (neck height) of the main magnetic pole of the perpendicular magnetic recording head as much as possible in order to obtain a large recording magnetic field. However, if the height is too short, fringing fields are generated. In the meantime, when it is too long, recording may be erased because of residual magnetism. That is, it is necessary to fabricate the recording head with high precision, since the height of the recording element affects greatly on the recording property.

Patent Document 1: Japanese Unexamined Patent Publication 2006-172691

Patent Document 2: Japanese Unexamined Patent Publication 2006-331562

However, with the conventional longitudinal recording method, accuracy in the height of the magnetic pole of the recording element has not been sought so severely. In the meantime, high precision is sought for the height of a reproducing element even with the longitudinal recording method. This is the same for the perpendicular recording method. Therefore, it is desired to fabricate both the reproducing element and the recording element with high precision for the perpendicular recording method.

Patent Document 1 discloses a method which polishes both the reproducing element and the recording element by adjusting angle of a jig by a laser auto collimator or the like. However, this method has such an issue that both elements cannot be adjusted with high precision since variations in the recording element cannot be suppressed even by adjusting the angle of an element forming face of a head with respect to a flying surface, if positions of the reproducing element and the recording element which are already being stacked on a wafer are shifted.

Patent Document 2 discloses a method which measures the heights of the reproducing element and the recording element after polishing, and adjusts the angle of polishing surface of a next bar. However, this method cannot adjust the angle during the actual polishing, so that it is not possible to set the elements in all the magnetic heads with high precision.

Further, the method disclosed in Patent Document 2 uses a polish amount detecting sensor for detecting the heights of the elements when lapping the reproducing element and the recording element. However, the height of each element is proportional to a reciprocal of the resistance of the polish amount detecting sensor. Thus, the resistance changing rate of the sensor is small in an area where the height is long, so that it is hard to see the shift between the recording element and the reproducing element. When the resistance changing rate becomes actually large, the height has already become very short. Thus, when the angle is to be adjusted at that point, it cannot be adjusted sufficiently. As a result, there comes to have two surfaces to be polished.

SUMMARY OF THE INVENTION

It is therefore an object of the present invention to improve the inconveniences of the conventional cases described above and, in particular, to provide a manufacturing method which can adjust the lengths of the recording element and the reproducing element for enabling manufacture of high-quality magnetic head sliders.

A magnetic head slider manufacturing method as one form of the present invention is a method which employs a structure that comprises: a stacked-layer forming step which stacks, on a substrate, magnetic heads each including a reproducing element and a recording element; a lapping step which cuts out a bar block having a plurality of connected magnetic head sliders containing the magnetic heads, and polishes a flying surface where the reproducing element and the recording element are exposed; and a slider cutting step which cuts out individual magnetic head sliders from the bar block, wherein: the stacked-layer forming step forms a reproducing-element polish amount detecting sensor whose output value changes by being polished on a same layer as that of the reproducing element, and forms a recording-element polish amount detecting sensor whose output value changes by being polished on a same layer as that of the recording element; and the lapping step carries out polishing based on each output value of the reproducing-element polish amount detecting sensor and the recording-element polish amount detecting sensor.

Particularly, the stacked-layer forming step forms the recording-element polish amount detecting sensor in a form in accordance with a length of the recording element.

With the present invention, first, the magnetic heads such as recording elements and reproducing elements for recording/reproducing data to/from disks are stacked on a substrate. At this time, the reproducing-element polish amount detecting sensor and the recording-element polish amount detecting sensor for detecting the polish amount in the lapping step are formed, respectively, on the same layers as those of the reproducing element and the recording element. Subsequently, the bar block containing a plurality of magnetic head sliders that include the magnetic heads stacked on the substrate, and the flying surface is polished. At this time, the output values of the reproducing-element polish amount detecting sensor and the recording-element polish amount detecting sensor are detected, and the bar block is polished based on the output values. This makes it possible to polish the bar block to adjust the lengths of the reproducing element and the recording element in accordance with the shift amount, when there is position shift between the reproducing element and the recording element. That is, each polish amount detecting sensor is formed with the same condition as that of the reproducing element or the recording element. Thus, it is possible to detect the position shift between the reproducing element and the recording element, which changes depending on the forming conditions of each element, through referring to the output values of the respective polish amount detecting sensors. By forming the recording-element polish amount detecting sensor in a form in accordance with the length of the recording element in particular, the position shift can be detected with still higher precision since the position shift between the recording element and the reproducing element generated according to the length of the recording element when being shaped can be reflected upon the recording-element polish amount detecting sensor. Though polishing the flying surface based on the shift, the recording element and the reproducing element can be adjusted to the appropriate lengths. Thereafter, the bar block is cut into individual magnetic head sliders, and an ABS is formed by etching or the like. Thereby, the magnetic head sliders can be manufactured.

Further, the stacked-layer forming step shapes forms of the recording element and the recording-element polish amount detecting sensor simultaneously. Furthermore, the stacked-layer forming step shapes the forms of the recording element and the recording-element polish amount detecting sensor by etching or milling.

Through shaping the recording element and the recording-element polish amount detecting sensor simultaneously, both can be shaped under an almost same condition. Therefore, the recording-element polish amount detecting sensor is also etched in accordance with the shaping state of the recording element, e.g., the extent of etching applied to the recording element. As a result, the position shift that may be generated with respect to the reproducing element in accordance with the shaping state of the recording element can be reflected upon the recording-element polish amount detecting sensor. Thus, the position shift can be detected with still higher precision. By continuing the polishing further based on the detected position shift, the recording element and the reproducing element can be adjusted to the appropriate lengths with high precision.

Further, the stacked-layer forming step forms the recording-element polish amount detecting sensor and the reproducing-element polish amount detecting sensor by aligning relative positions of an end part of the recording-element polish amount detecting sensor and an end part of the reproducing-element polish amount detecting sensor positioned on a flying surface side of the magnetic head slider with respect to a polishing direction. Furthermore, the stacked-layer forming step forms the recording-element polish amount detecting sensor by aligning a shaping-target position of the end part of the recording-element polish amount detecting sensor to the position of the end part of the reproducing-element polish amount detecting sensor in the polishing direction. Moreover, the stacked-layer forming step forms the recording-element polish amount detecting sensor by setting a shaping-target form of the recording-element polish amount detecting sensor as almost a same form as that of the reproducing-element polish amount detecting sensor.

Through forming each sensor by aligning the relative positions of the recording-element polish amount detecting sensor and the reproducing-element polish amount detecting sensor in advance, it becomes possible with the polish amount detecting sensors to detect the position shift of the respective elements formed on the same layers with still higher precision. Therefore, the shift that may be generated with respect to the reproducing element at the time of shaping the recording element can be detected with high precision. By polishing the flying surface further in accordance with the detected shift, the recording element and the reproducing element can be adjusted to the appropriate lengths with still higher precision.

Further, the stacked-layer forming step forms the recording-element polish amount detecting sensor and/or the reproducing-element polish amount detecting sensor substantially in a ladder form which includes a plurality of band-like parts extended perpendicularly to a polishing direction provided at a prescribed interval and includes a pair of connection parts for connecting end parts of the plurality of band-like parts with each other. Furthermore, the stacked-layer forming step forms the recording-element polish amount detecting sensor in the form including the plurality of band-like parts, and forms a larger number of the band-like parts on the flying surface side.

At least one of the polish amount detecting sensors has the bad-like parts that are perpendicular to the polishing direction. Thus, the output value changes with a prescribed proportion when the band-like part is being polished, while the output value does not change and stays constant when the area between the band-like parts is being polished. Therefore, the position shift between each of the elements can be detected with high precision from the changes in the output values. As a result, the recording element and the reproducing element can be adjusted to the appropriate lengths with still higher precision by polishing the flying surface in accordance with the detected shift.

Further, the stacked-layer forming step stacks the reproducing-element polish amount detecting sensor and the recording-element polish amount detecting sensor by electrically connecting one of output terminals of the reproducing-element polish amount detecting sensor and one of output terminals of the recording-element polish amount detecting sensor to the substrate side, and electrically connecting other output terminal of the reproducing-element polish amount detecting sensor and other output terminal of the recording-element polish amount detecting sensor to prescribed terminal parts that are provided on a top layer when forming stacked-layers. Furthermore, the stacked-layer forming step stacks the reproducing-element polish amount detecting sensor and the recording-element polish amount detecting sensor by electrically connecting the other output terminals of the reproducing-element polish amount detecting sensor and the recording-element polish amount detecting sensor, respectively, to the terminal provided for inputting a prescribed signal to the magnetic head, and to the terminal part that is not connected to the magnetic head.

One of the output terminals of the respective polish amount detecting sensor is connected to the substrate and grounded, and the others are connected to the terminal parts formed on the top layer. Thereby, the half the output terminals are grounded to the substrate, so that the number of unnecessary terminal parts formed on the bar block can be reduced. As a result, the manufacturing cost can be reduced. In particular, the number of terminal parts to be formed anew for the sensor detections can be reduced further by utilizing the existing terminal part of the magnetic head slider as the terminal part to which the output terminals of the polish amount detecting sensors are connected. This makes it possible to reduce the manufacturing cost still further.

Further, the slider cutting step cuts out the magnetic head slider from the bar block in such a manner that the magnetic head slider does not contain the terminal part that is not connected to the magnetic head to which the other output terminal of the reproducing-element polish amount detecting sensor or the other output terminal of the recording-element polish amount detecting sensor is connected. Furthermore, the slider cutting step cuts out the magnetic head slider from the bar block in such a manner that the magnetic head slider does not contain the reproducing-element polish amount detecting sensor and the recording-element polish amount detecting sensor.

This makes it possible to cut out each of the polish amount detecting sensors itself and the terminal parts utilized for detections of each polish amount detecting sensor, which are the unnecessary structures for the magnetic head slider. Therefore, weight of the magnetic head slider can be reduced.

Further, the lapping step performs polishing by adjusting an polishing angle of the bar block based on the output values of the reproducing-element polish amount detecting sensor and the recording-element polish amount detecting sensor. Particularly, the lapping step employs a structure that comprises: a sensor output value detecting step which detects the output values of the reproducing-element polish amount detecting sensor and the recording-element polish amount detecting sensor while polishing the bar block; a polishing-angle setting step which sets the polishing angle of the bar block in accordance with the detected output values; and a length-adjusting polishing step which polishes the bar block so that the reproducing element and the recording element come to be in desired lengths.

Further, the stacked-layer forming step forms a pair of polishing-end detecting sensors whose output values change, respectively, when the recording element is polished, in such a manner that the output values of the respective polishing-end detecting sensors coincide with each other with a prescribed polishing amount; and the lapping step stops the polishing when the output values of the respective polishing-end detecting sensors come under a state considered as consistent with each other according to a criterion set in advance. Furthermore, the stacked-layer forming step forms at least one of the pair of polishing-end detecting sensors substantially in a ladder form which includes a plurality of band-like parts extended perpendicularly to a polishing direction provided at a prescribed interval and includes a pair of connection parts for connecting end parts of the plurality of band-like parts with each other. Moreover, the stacked-layer forming step forms each of the pair of polishing-end detecting sensors substantially in the ladder form in such a manner that positions of the band-like parts in the polishing direction of the respective polishing-end detecting sensors come to be different between each of the polishing-end detecting sensors. Further, the stacked-layer forming step forms the recording-element polish amount detecting sensor as one of the pair of polishing-end detecting sensors.

Through stopping the polishing of the bar block when the output values of each sensor are judged as consistent by monitoring, in the lapping step, the output values of the pair of polishing-end detecting sensors formed in the stacked-layer forming step, the polishing-end position can be specified more precisely. Therefore, the length of the recording element can be adjusted with still higher precision.

A bar block as another form of the present invention is a cut-out bar block having a plurality of connected magnetic head sliders that are stacked on a substrate, the magnetic head sliders comprising magnetic heads each including a reproducing element and a recording element, wherein: a reproducing-element polish amount detecting sensor whose output value changes by being polished is formed on a same layer as that of the reproducing element; and a recording-element polish amount detecting sensor whose output value changes by being polished is formed on a same layer as that of the recording element. Further, the bar block employs such a structure that the recording-element polish amount detecting sensor is shaped in a form in accordance with a length of the recording element.

Further, the bar block employs such a structure that the recording-element polish amount detecting sensor and the reproducing-element polish amount detecting sensor are formed by aligning relative positions of an end part of the recording-element polish amount detecting sensor and an end part of the reproducing-element polish amount detecting sensor positioned on a flying surface side of the magnetic head slider with respect to a polishing direction. Furthermore, the recording-element polish amount detecting sensor and/or the reproducing-element polish amount detecting sensor is formed substantially in a ladder form which includes a plurality of band-like parts extended perpendicularly to a polishing direction provided at a prescribed interval and includes a pair of connection parts for connecting end parts of the plurality of band-like parts with each other.

Further, the bar block employs such a structure that one of output terminals of the reproducing-element polish amount detecting sensor and one of output terminals of the recording-element polish amount detecting sensor are electrically connected to the substrate side, and other output terminal of the reproducing-element polish amount detecting sensor and other output terminal of the recording-element polish amount detecting sensor are electrically connected to prescribed terminal parts that are provided on a top layer of the magnetic head. Furthermore, the other output terminals of the reproducing-element polish amount detecting sensor and the recording-element polish amount detecting sensor are electrically connected, respectively, to the terminal provided for inputting a prescribed signal to the magnetic head, and to the terminal part that is not connected to the magnetic head. Moreover, a pair of polishing-end detecting sensors whose output values change, respectively, when the recording element is polished, is formed in such a manner that the output values of the respective polishing-end detecting sensors coincide with each other with a prescribed polishing amount.

A magnetic head slider manufacturing device as still another form of the present invention is a magnetic head slider manufacturing device which comprises: a stacked-layer forming device which stacks, on a substrate, magnetic heads each including a reproducing element and a recording element; a bar block cutting device which cuts out a bar block having a plurality of connected magnetic head sliders containing the magnetic heads; a lapping device which polishes a flying surface where the reproducing element and the recording element are exposed; and a slider cutting device which cuts out individual magnetic head sliders from the bar block, wherein: the stacked-layer forming device forms a reproducing-element polish amount detecting sensor whose output value changes by being polished on a same layer as that of the reproducing element, and forms a recording-element polish amount detecting sensor whose output value changes by being polished on a same layer as that of the recording element; and the lapping device comprises a sensor output value detecting device provided for detecting output values of the reproducing-element polish amount detecting sensor and the recording-element polish amount detecting sensor when the bar block is polished by the lapping device, and polishes the bar block based on the output value detected by the sensor output value detecting device.

Further, the stacked-layer forming device forms the recording-element polish amount detecting sensor in a form in accordance with a length of the recording element.

Furthermore, the magnetic head slider manufacturing device employs such a structure that comprises a polishing-angle setting device which sets the polishing angle of the bar block in accordance with the output value detected by the sensor output value detecting device, wherein the lapping device polishes the bar block at the angle set by the polishing-angle setting device.

With the bar block and the magnetic head slider manufacturing device in the above-described structures, it is also possible to achieve the above-described object of the present invention, which is to adjust the recording element and the reproducing element with high precision and to manufacture the high-quality magnetic head sliders, as in the case of the magnetic head slider manufacturing method.

The present invention is structured and functions as described above. With the present invention, the reproducing-element polish amount detecting sensor and the recording-element polish amount detecting sensor are formed on the same layer of the reproducing element or the recording element, and the each output value is detected. This makes it possible to detect the position shift between the reproducing element and the recording element, which changes depending of the forming conditions of each element. The present invention can provide such an excellent effect that has not been able to be achieved conventionally. That is, it is possible to adjust the lengths of the recording element and the reproducing element with high precision through polishing the flying surface by controlling the polishing state based on the position shift, and to manufacture the high-quality magnetic head sliders.

BRIEF DESCRIPTION OF THE DRAWINGS

FIG. 13 is an illustration showing a state of measurements performed by each sensor, when polishing a bar block;

FIGS. 17 (A) and (B) are an illustration showing a modification example of the reproducing-element polish amount detecting sensor and the recording-element polish amount detecting sensor;

FIGS. 23 (A)-(C) show illustrations showing forms of polishing-end detecting sensors according to a second embodiment;

DETAILED DESCRIPTION OF THE PREFERRED EMBODIMENTS

The present invention regards to a manufacturing method which can adjust both a recording element and a reproducing element with high precision in a perpendicular-recording type magnetic head slider in particular. The specific manufacturing method will be described hereinafter by referring to embodiments. The manufacturing method as the present invention is preferably used for manufacturing the perpendicular-recording type magnetic head sliders. However, it is to be understood that the manufacturing method is not necessarily limited to the cases of manufacturing the perpendicular-recording type magnetic head sliders.

First Embodiment

Figure 1A:
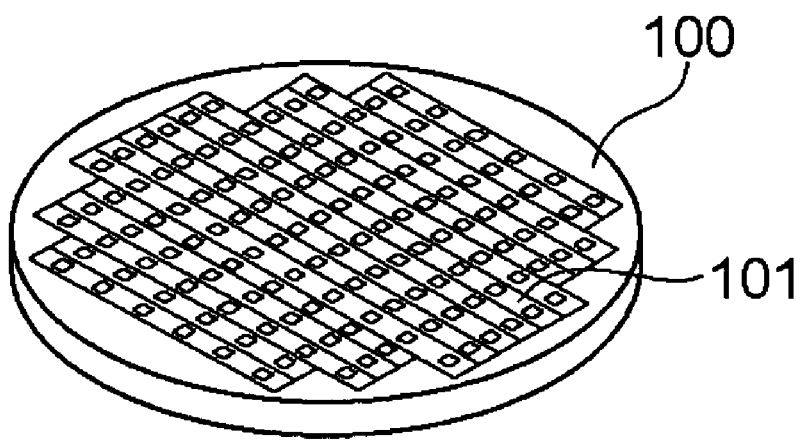
FIG. 1A is an illustration showing a state where magnetic heads are stacked on a substrate.
Figure 1B:
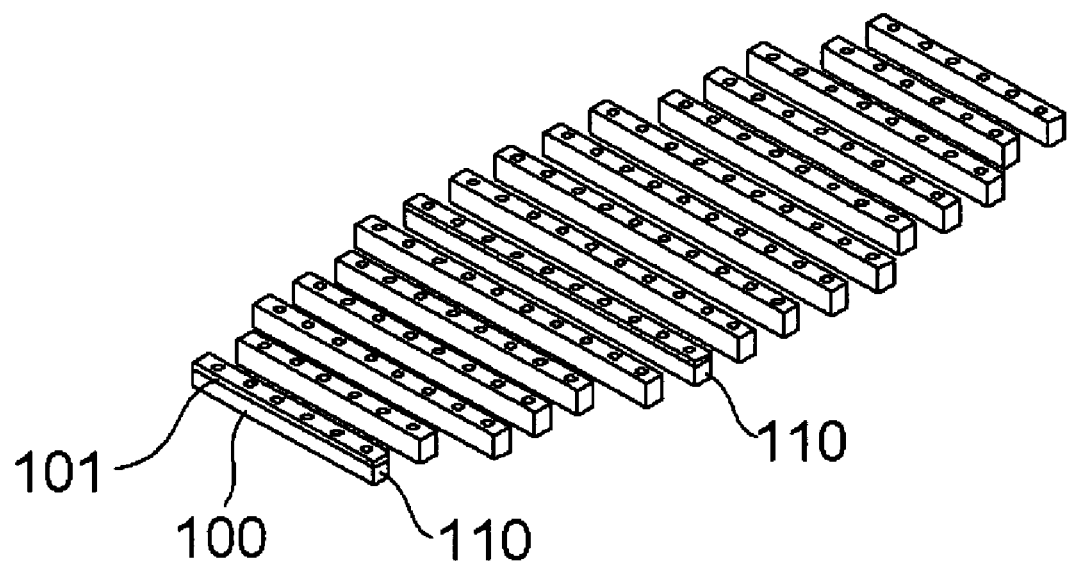
FIG. 1B is an illustration showing a state where the magnetic heads on the substrate are cut out to bar blocks.
Figure 2:
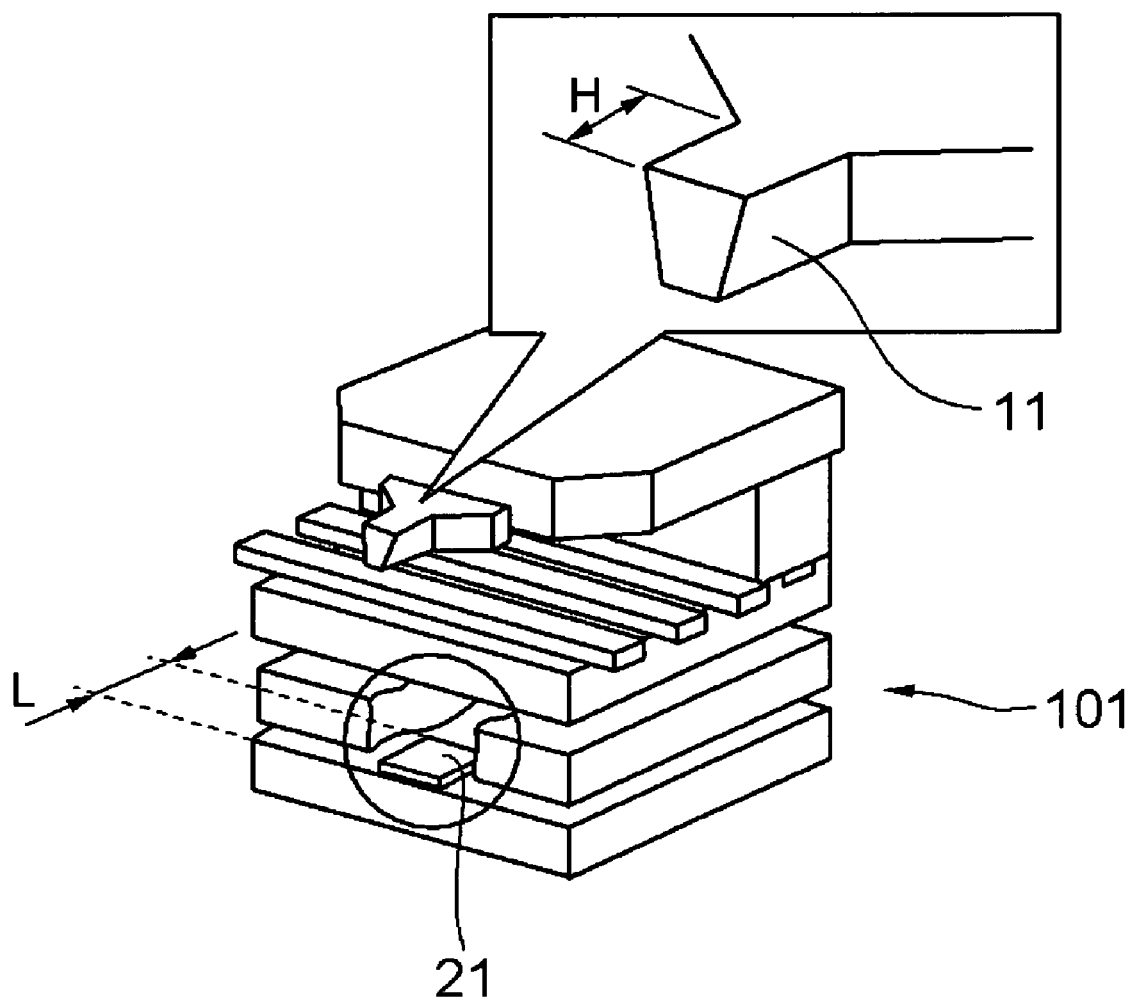
FIG. 2 is an illustration showing a laminated structure of the magnetic head.
Figure 3:
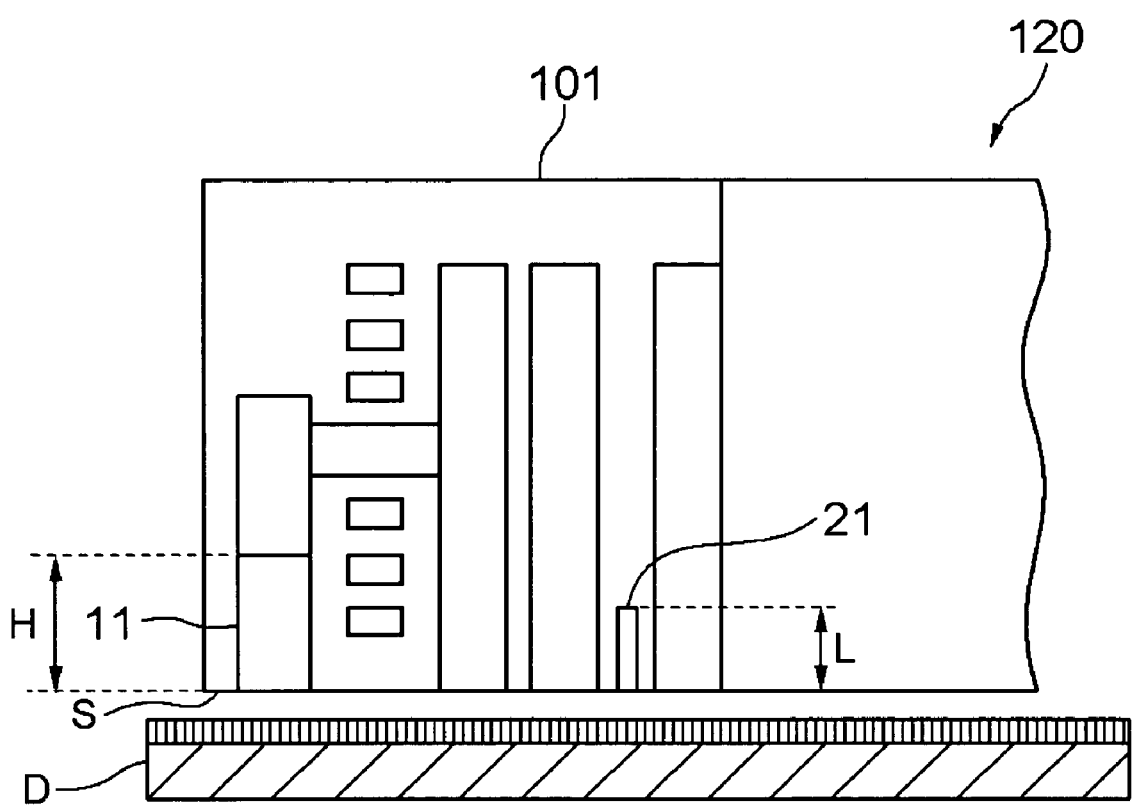
FIG. 3 is an illustration showing a laminated structure of the magnetic head.
Figure 4:
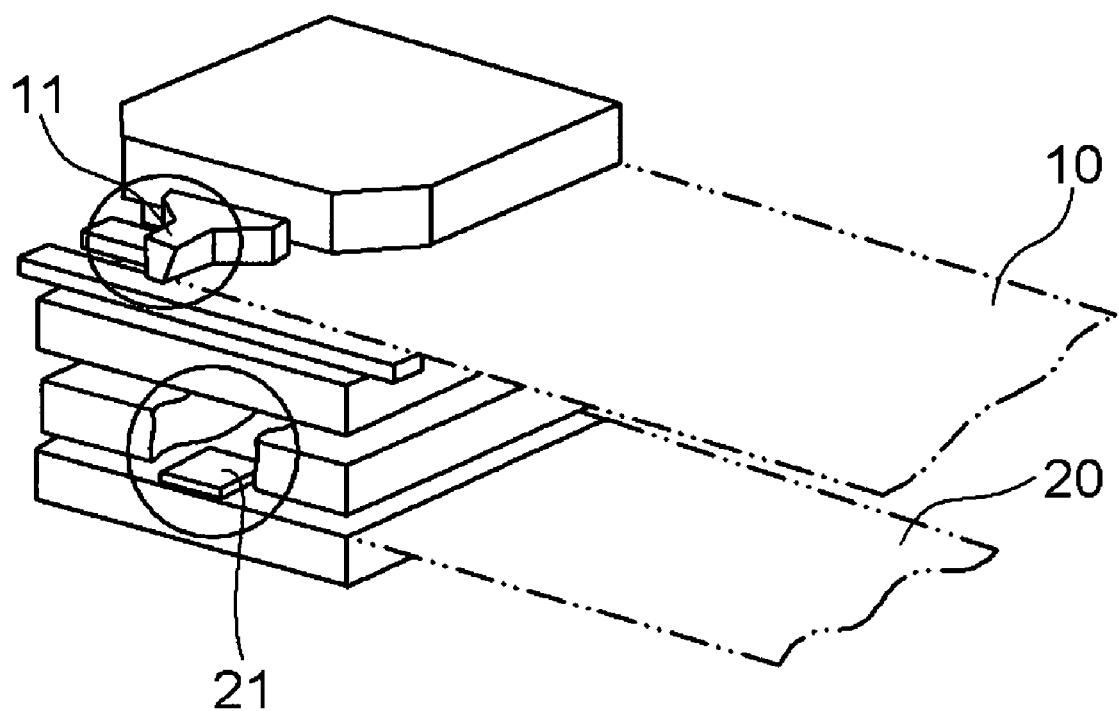
FIG. 4 is an illustration showing a structure of a reproducing-element forming layer and a recording-element forming layer of the magnetic head.
Figure 5:
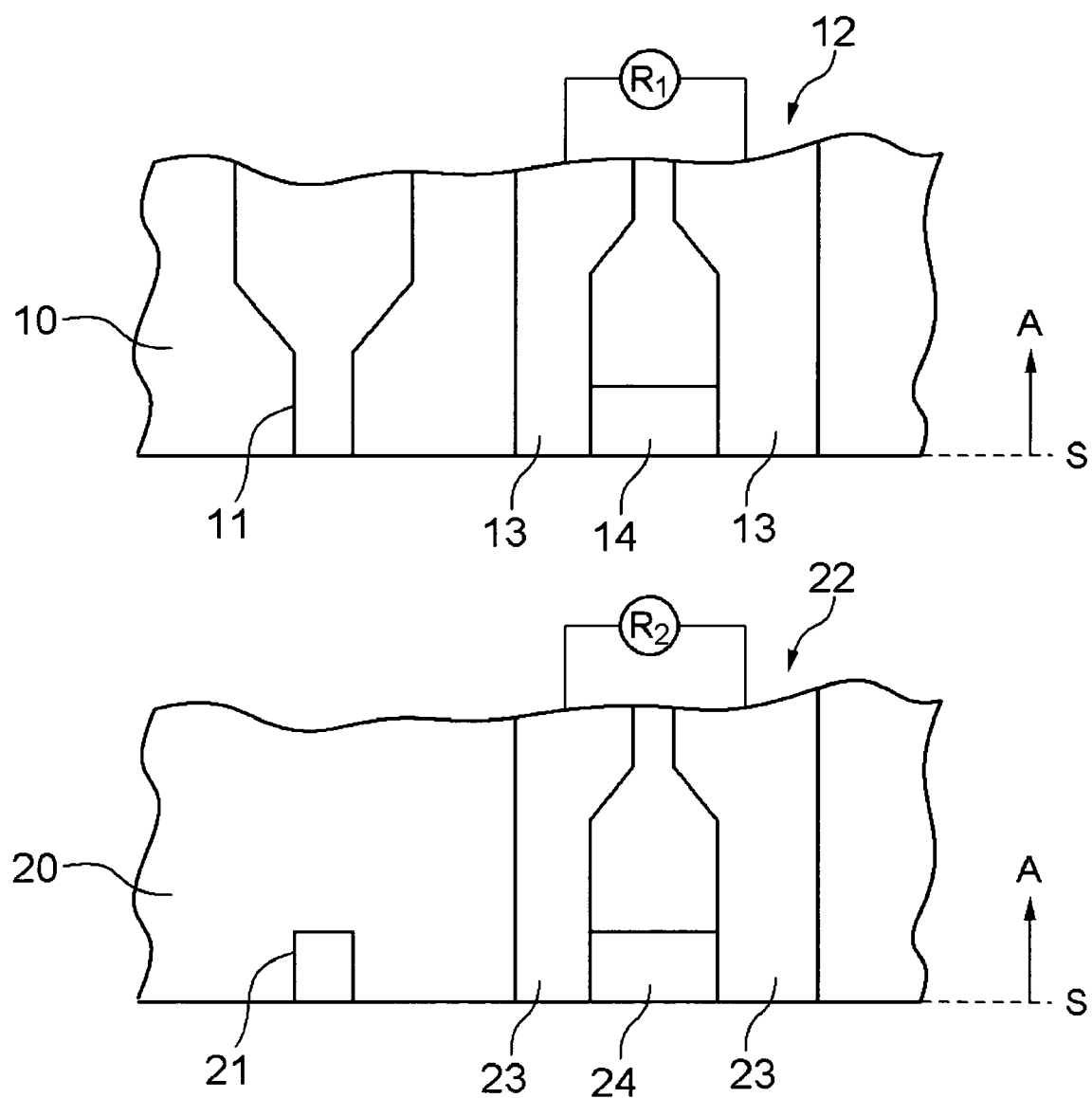
FIG. 5 is an illustration showing the structure of the reproducing-element forming layer and the recording-element forming layer of the magnetic head.
Figure 14A:
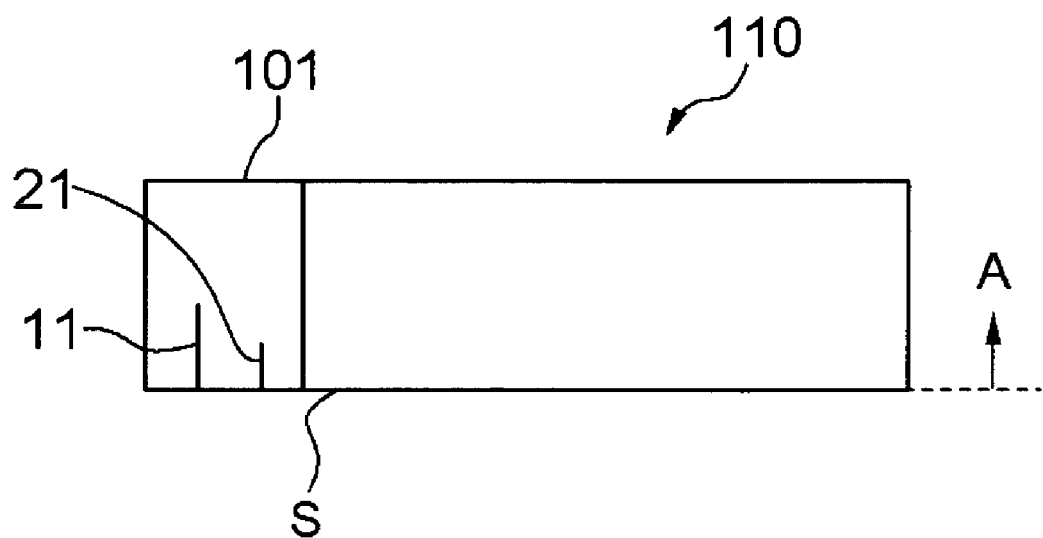
FIGS. 14 (A) and (B) show illustrations of states at the time of adjusting polishing angle for the bar block.
Figure 14B:
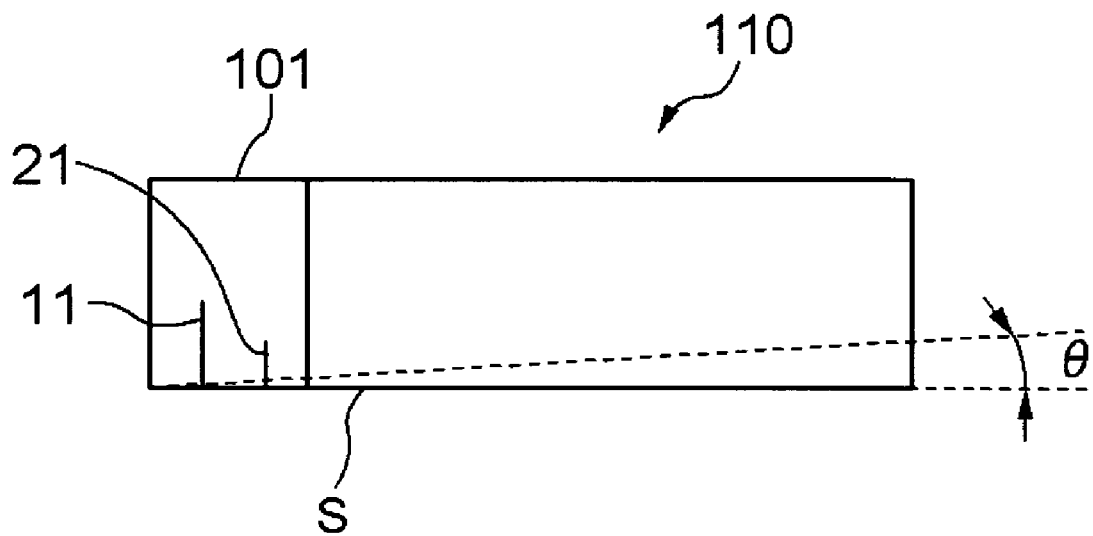
Figure 15:
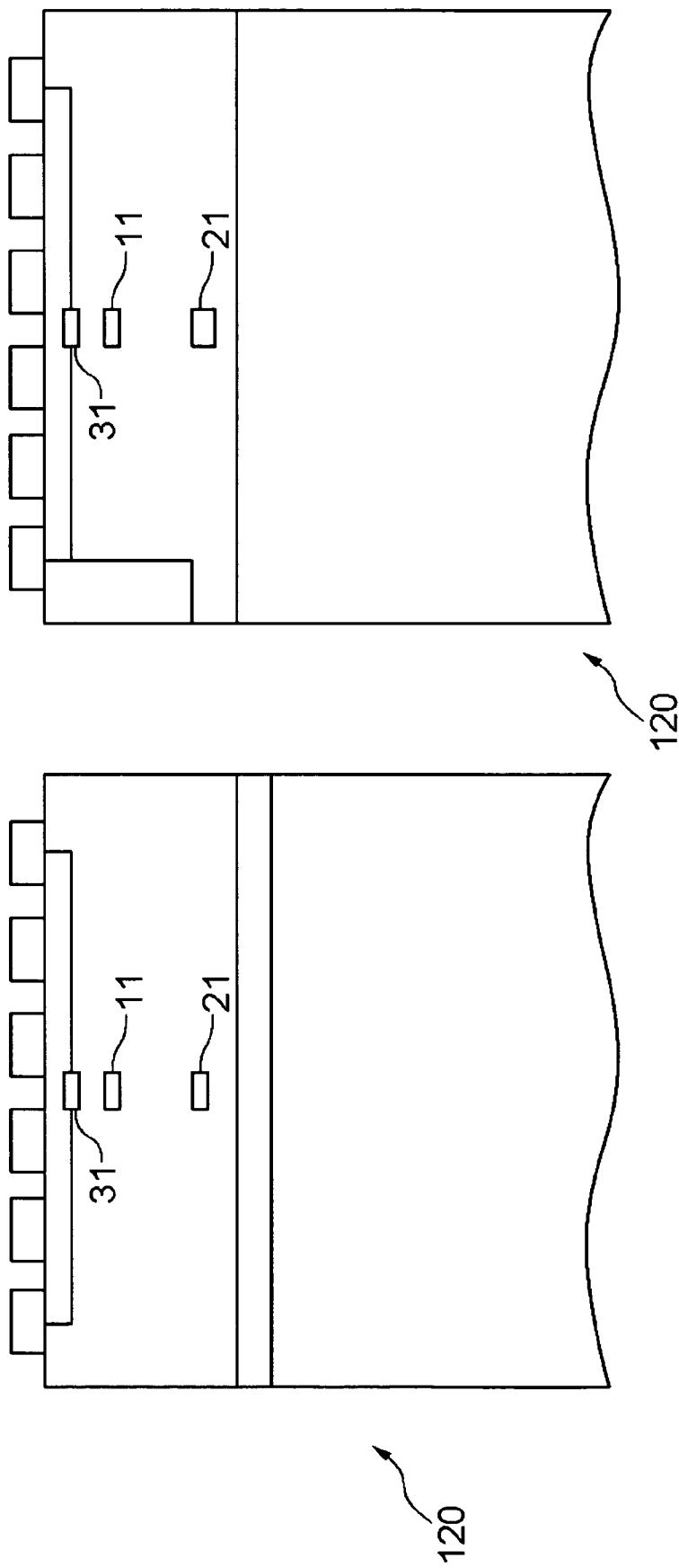
FIG. 15 is an illustration showing a state when cutting out magnetic head sliders from the bar block.
Figure 21A:
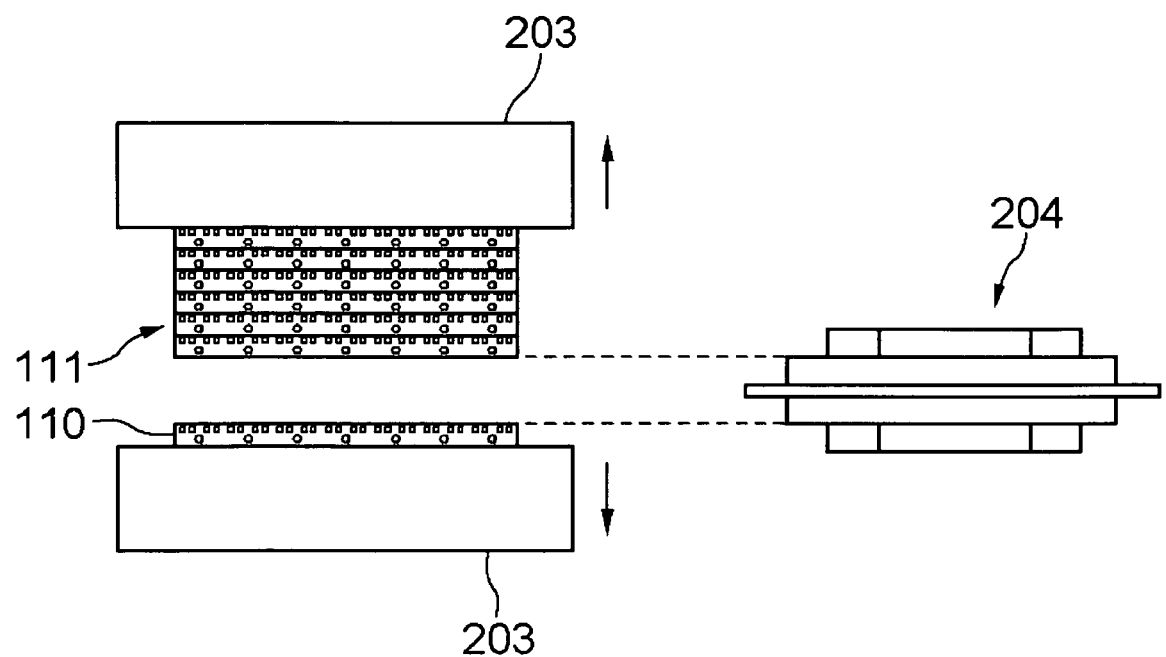
FIGS. 21 (A) and (B) show schematic illustrations of the manufacturing process and the manufacturing device of the magnetic head slider.
Figure 21B:
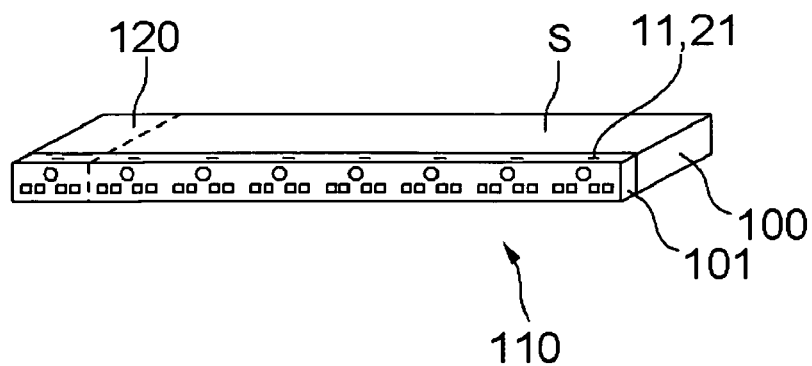
Figure 22A:
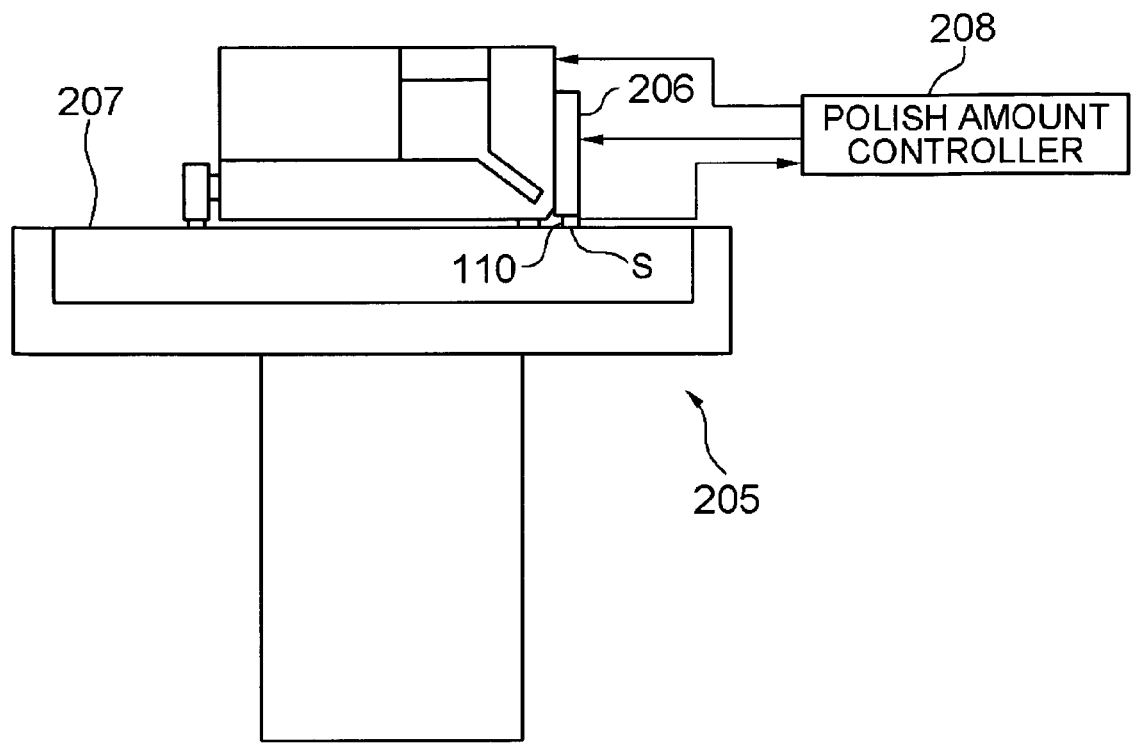
FIGS. 22 (A) and (B) show shows schematic illustrations of the manufacturing process and the manufacturing device of the magnetic head slider.

A first embodiment of the present invention will be described by referring to FIG. 1-FIG. 22. FIG. 1 is an illustration showing a state where magnetic heads are stacked on a substrate. FIG. 2 and FIG. 3 are illustrations showing the laminated structure of the magnetic head part. FIG. 4 and FIG. 5 are illustrations showing the structure of a reproducing-element forming layer and a recording-element forming layer. FIG. 6-FIG. 12 are illustrations showing the structure of the reproducing-element forming layer and the recording-element forming layer, and a state at the time of polishing. FIG. 13 is an illustration showing a state of measurements, when polishing a magnetic head slider. FIG. 14 shows illustrations of states at the time of adjusting polishing angle for the magnetic head slider. FIG. 15 is an illustration showing a state when cutting out magnetic head sliders from a bar block. FIG. 16 shows illustrations for describing a relation between the thickness of the sensor and the resistance. FIG. 17 and FIG. 18 are illustrations showing modification example of the present invention. FIG. 19 is a flowchart showing steps for manufacturing the magnetic head slider. FIG. 20-FIG. 22 show schematic illustrations of a manufacturing process and a manufacturing device of the magnetic head slider.
(Outlines of Manufacturing Method)

Figure 19:
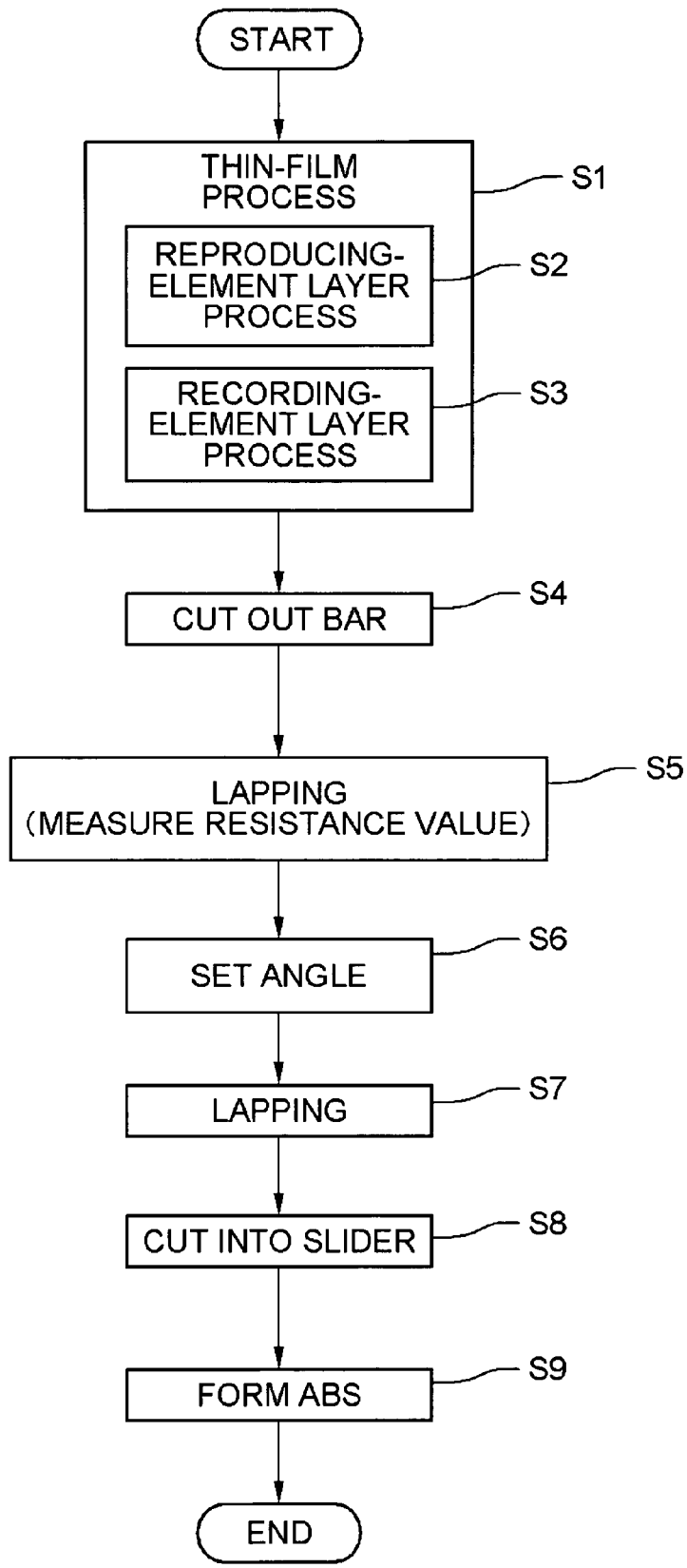
FIG. 19 is a flowchart showing steps for manufacturing the magnetic head slider.
Figure 20A:
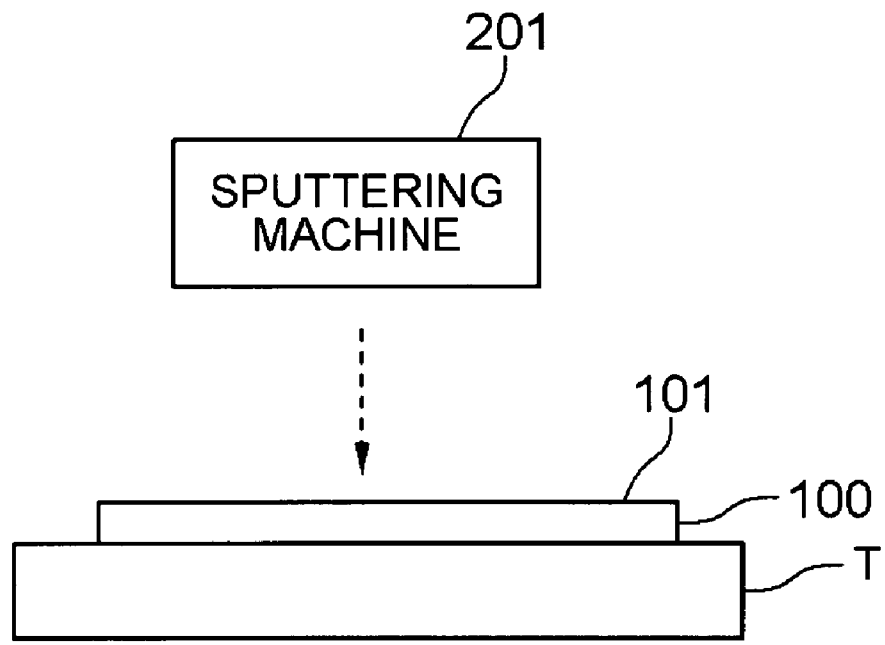
FIGS. 20 (A) and (B) show schematic illustrations of a manufacturing process and a manufacturing device of the magnetic head slider.
Figure 20B:
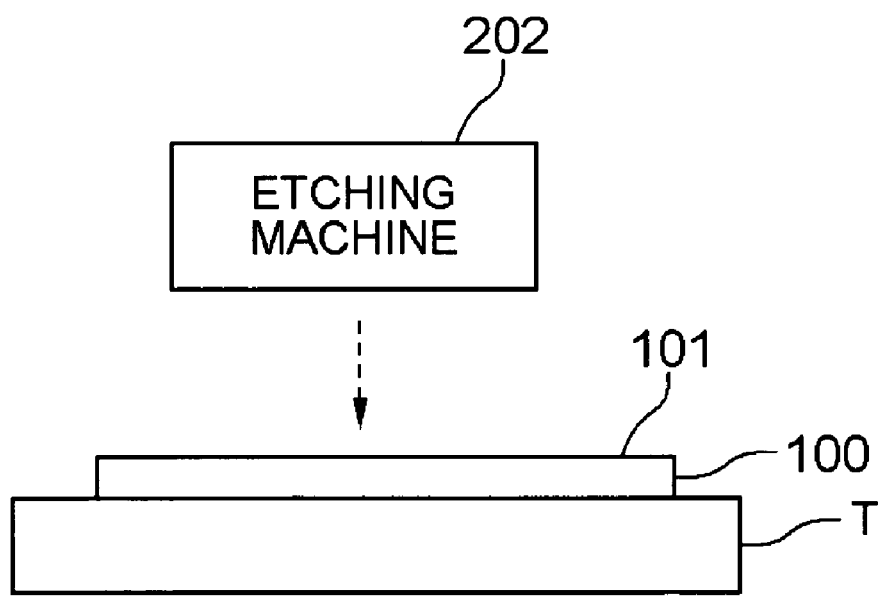

First, outlines of the magnetic head slider manufacturing method and manufacturing device will be described. As shown in FIG. 1A, magnetic heads 101 made of a great number of thin film layers are stacked on a wafer 100 (substrate) made of a ceramics material, for example, by a thin-film forming step (thin-film process (step S1) of FIG. 19) using photolithography or the like. For example, as shown in FIG. 20A, a stacked-layer material is sputtered on the wafer 100 loaded on a table T by using a sputtering machine 201 (stacked-layer forming device). Then, as necessary, resist, exposure, and development are performed on the sputtered thin films, and the thin film layers are shaped into a desired form by an etching machine 202 (stacked-layer forming device) of FIG. 20B. Thereby, the part to be the magnetic heads 101 is formed on almost the whole surface of the wafer 100, as shown in FIG. 1. That is, as shown in FIG. 2 and FIG. 3, the part to be the magnetic heads 101 where reproducing elements 21, recording elements 11, and the like are laminated is formed on the wafer 100. With the present invention, in the stacked-layer forming step (step S1 of FIG. 19), a reproducing-element polish amount detecting sensor 22 is formed on a layer 20 where the reproducing element 21 is formed (a reproducing-element layer process (step S2 of FIG. 19)), and a recording-element polish amount detecting sensor 12 is formed on a layer 20 where the recording element 11 is formed (a recording-element layer process (step S3 of FIG. 19)). These steps will be described later.

Subsequently, the wafer 100 shown in FIG. 1A on which the magnetic heads 101 are formed is cut into long and narrow bar blocks 110 where a plurality of magnetic head sliders are connected (step S4 of FIG. 19). For example, as shown in FIG. 21A, a block 111 where a plurality of bar blocks 110 are connected is held by a jig 203 from the top and bottom sides and pulled in the perpendicular direction, and bar blocks 110 are cut out one by one by a cutter 204 (a bar block cutting device). In this manner, each bar block 110 is cut out as in FIG. 1B and FIG. 21B. The bar block 110 is cut into individual magnetic head sliders 120 later as illustrated with a totted line in FIG. 21B. At this point, the laminated part formed in the stacked-layer forming step as described above comes to be the magnetic head 101, and the wafer 100 part becomes a slider. Further, the surface where the recording element 11 and the reproducing element 21 are exposed is a flying surface S that floats with respect to a disk, which is a polishing surface to be polished later.

Subsequently, the surface of the bar block 110 to be the flying surface S of the magnetic head slider 120 is polished (a lapping step) by a lapping unit 205 (a lapping device) as shown in FIG. 2A. At this time, the bar block 110 is supported by a polishing-angle setting unit 206 (a polishing-angle setting device) which sets the polishing angle of the lapping unit 205 with respect to a polishing surface 207. Further, a polish amount controller 208 (sensor output value detecting device) is connected to a pad (terminal part) formed on the polished bar block 110 so as to measure output values from each of the polish-amount detecting sensors mounted to the bar block 110 at the time of polishing (a sensor output value detecting step; step S5 of FIG. 19), as will be described later.

Further, the polish amount controller 208 controls operations of the lapping unit 205 and the polishing-angle setting unit 206. Specifically, the polish amount controller 208 sets the angle of the polishing surface of the bar block 110 by controlling the polishing-angle setting unit 206 based on the output values detected by each polish amount detecting sensor (a polishing-angle setting step; step S6 of FIG. 19). Then, the polish amount controller 208 controls the polish amount through controlling the lapping unit 205 to set the polishing time and the like in such a manner that the recording element 11 and the reproducing element 12 come to have desired lengths (a length-adjusting polishing step; step S7 of FIG. 19).

Figure 22B:
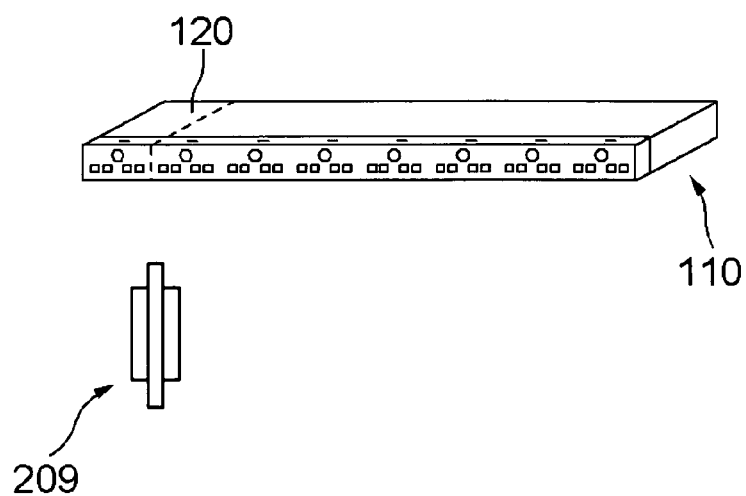

Thereafter, as shown in FIG. 22B, the bar block 110 is cut into individual magnetic head sliders 120 (a slider cutting step; step S8 of FIG. 19) by a slider cutter 209 (a slider cutting device). Then, ABS in a prescribed shape is formed in the flying surface S of the cut-out individual magnetic head slider 120 (step S9 of FIG. 19), and a prescribed treatment such as cleaning is performed. Thereby, manufacture of the magnetic head sliders 120 is completed.
(Details of Manufacturing Method)

Next, details of the above-described magnetic head slider manufacturing method will be described. The present invention has specific features in its stacked-layer forming step for laminating the magnetic head 101 part on the wafer 100 and the stacked-layer structure, in particular. Further, it has a specific feature in its lapping step for polishing the flying surface, after the wafer to the bar blocks 110. Therefore, the feature steps will be described in details hereinafter.

First, the magnetic head slider 120 to be manufactured will simply be described by referring to FIG. 2 and FIG. 3. The magnetic head slider 120 comprises a slider part that is the wafer 100, and the magnetic head 101 stacked on the tip part (top face). The magnetic head 101 part has the reproducing element 21 such as a GMR element for reading out data from a disk D and the recording element 11 as a recoding magnetic pole for recording data to the disk D by a perpendicular recording method, which are formed with thin-film laminated layers. As shown in FIG. 3, the recording element 11 and the reproducing element 21 are exposed on the flying surface S which faces against the recording surface of the disk D and, as described above, it is necessary to adjust the length from the flying surface S with high precision in order to achieve high recording/reproducing accuracy. The length of the recording element 11 in the present invention indicates the length of a so-called neck-height H part, which is the length of the part extending in the longitudinal direction among a substantially Y-shaped structure, as shown in the enlarged view of FIG. 2. The length H of the recording element 11 and the length L of the reproducing element 21 are simultaneously adjusted by the polish amount at the time of lapping. However, shift in the positions of the recording element 11 and the reproducing element 21 makes it difficult to perform adjustments to the proper lengths. Hereinafter, the manufacturing method capable of overcoming such inconvenience will be described.

First, in the stacked-layer forming step (step S1 of FIG. 19), each of the polish amount detecting sensors 12, 22 is formed, respectively, as in FIG. 5 on a layer 10 where the recording element 11 is formed and on a layer 20 where the reproducing element 21 is formed, as shown in FIG. 4. Specifically, first, a material to be the reproducing element 21 is deposited on the forming layer 20 of the reproducing element 21, and the reproducing element 21 is shaped by etching and milling, while forming the reproducing-element polish amount detecting sensor 22 on the same layer 20 at the same time (step S2 of FIG. 19). The reproducing-element polish amount detecting sensor 22 is shaped into a form having a band-like part 24 extending in parallel to the flying surface S as the polishing surface and a pair of connection parts 23 connected on both ends of the band-like part 24. The band-like part 24 of the reproducing-element polish amount detecting sensor 22 is polished towards an arrow A direction from the polishing surface S along with the reproducing element 21, so that its shape becomes smaller in accordance with the polish amount. Therefore, the polish amount of the reproducing element 21 part can be detected by detecting a resistance value R2 of the band-like part 24 via the connection parts 23.

Further, in the same manner described above, a material to be the recording element 11 is deposited on the forming layer 10 of the recording element 11, and the recording element 11 is shaped by etching and milling, while forming the recording-element polish amount detecting sensor 12 on the same layer 10 at the same time (step S3 of FIG. 19). The recording-element polish amount detecting sensor 12 is constituted with a band-like part 14 extending in parallel to the flying surface S as the polishing surface and a pair of connection parts 13 connected on both ends of the band-like part 14. The band-like part 14 of the recording-element polish amount detecting sensor 12 is polished towards an arrow A direction from the polishing surface S along with the recording element 11, so that its shape becomes smaller in accordance with the polish amount. Therefore, the polish amount of the recording element 11 part can be detected by detecting a resistance value R1 of the band-like part 14 via the connection parts 13.

Figure 6:
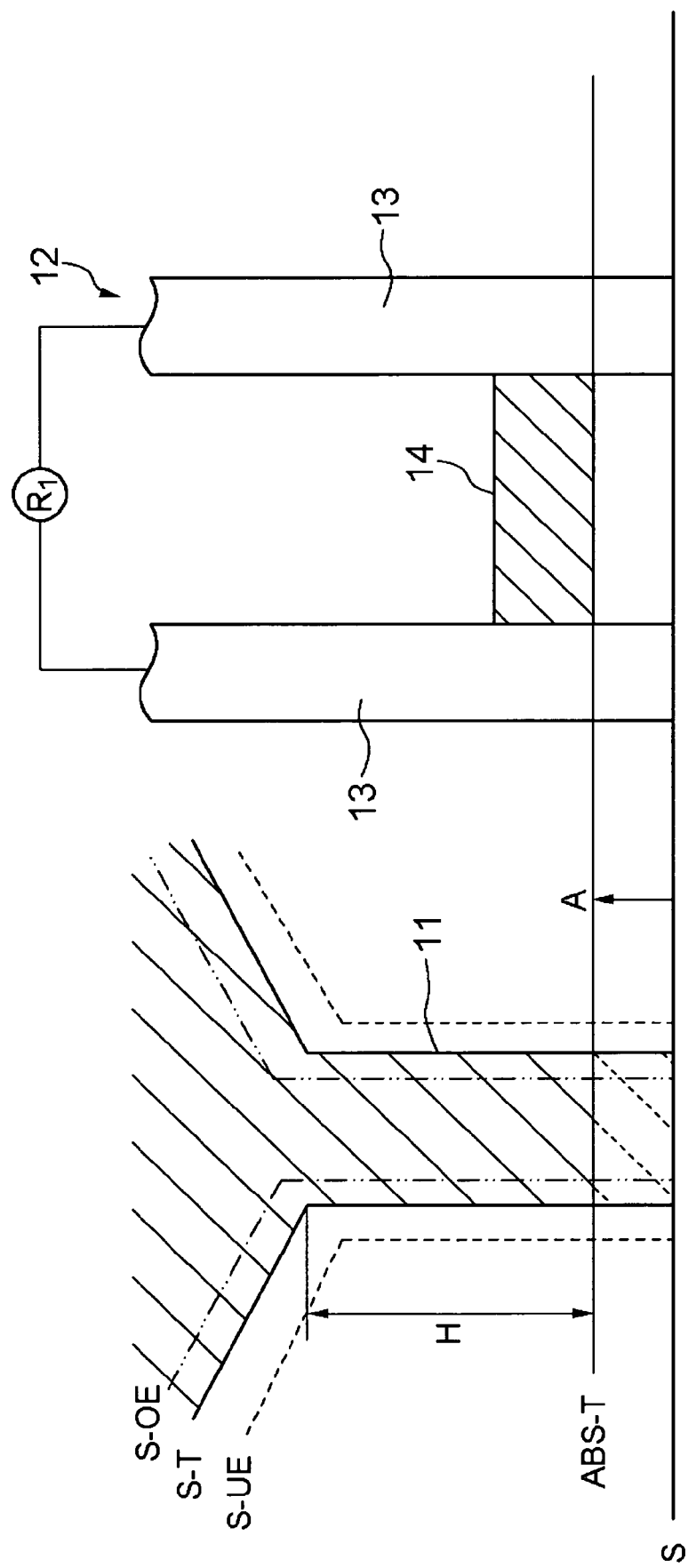
FIG. 6 is an illustration showing the structure of the recording-element forming layer and a state at the time of polishing.
Figure 7:
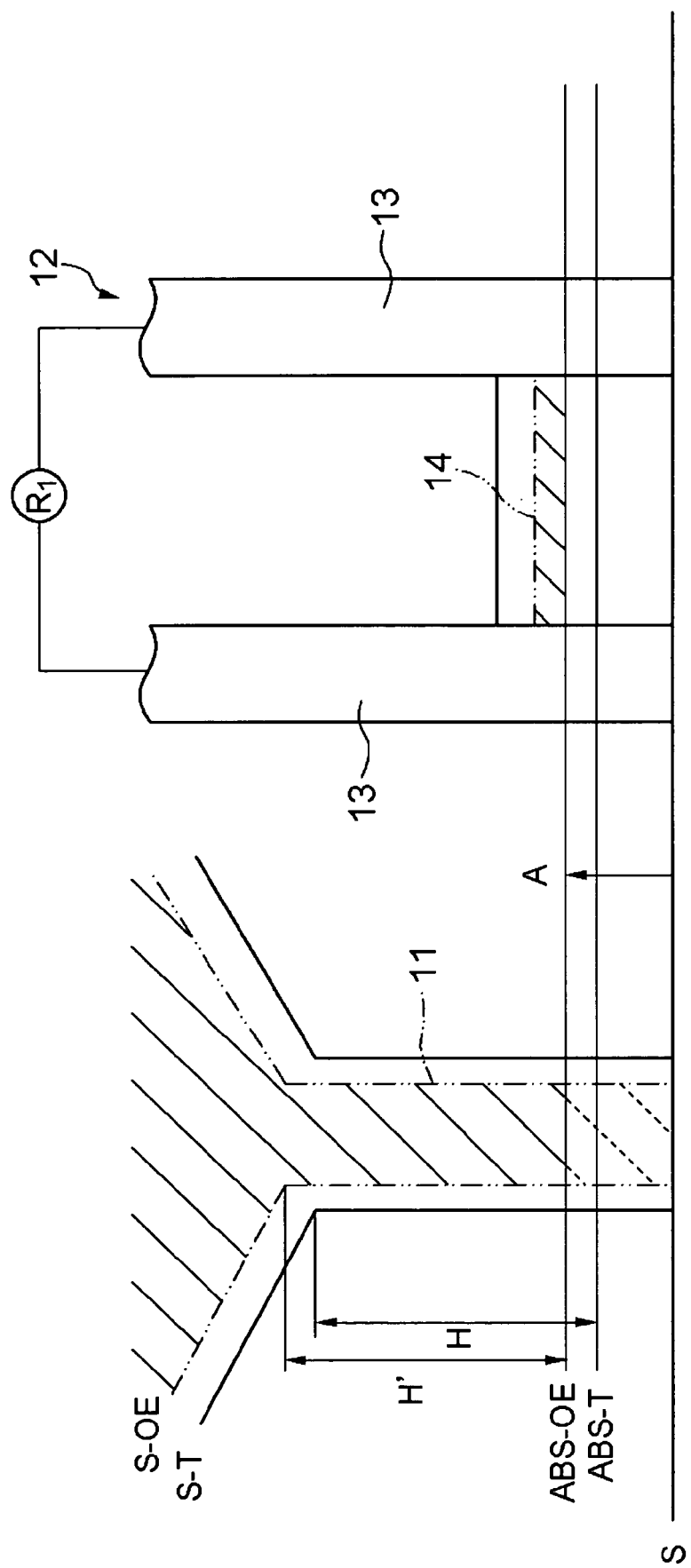
FIG. 7 is an illustration showing the structure of the recording-element forming layer and a state at the time of polishing.

As described above, by providing the recording-element polish amount detecting sensor 12 on the same layer as that of the recording element 11 in the stacked-layer forming step, the neck heights H can be adjusted uniformly even if there is shaping shift generated at the time of shaping the recording elements 11 by etching or the like. For example, FIG. 6 shows the forming layer of the recording element 11. There is considered a case where the recording element 11 is shaped into a form (a form shown with oblique lines) which is illustrated with a solid line S-T by etching. In this case, it is possible to set to an ideal neck height H by polishing the flying surface S to the line ABS-T (see an arrow A). Therefore, the neck height H can be easily set to the ideal height, by aligning the bottom end of the band-like part 14 of the recording-element polish amount detecting sensor 12 to the ABS-T line (shown with oblique lines in FIG. 6) and ending the polishing when the resistance value of the sensor 12 changes. The ABS-T line also indicates a position where the reproduction 21 comes to have an ideal length L.

In practice, however, there are cases where etching is performed excessively (over-etching) as shown with an S-OE line of FIG. 6 or cases where etching is performed insufficiently (under-etching) as shown with an S-UE line of FIG. 6. Specifically, in a case of over-etching (part with oblique lines) as shown with alternate long and two short dashes line S-OE of FIG. 7, the length of the neck height of the recording element 11 cannot be made optimum if the flying surface S is polished to the ABS-T line that is the initial target position of the polishing for having the proper length of the reproducing element 21. However, as described above, the band-like part 14 is also over-etched when the recording-element polish amount detecting sensor 12 is formed on the same layer 10 as that of the recording element 11 and it is shaped simultaneously with the etching of the recording element 11. Thereby, the band-like part 14 comes to be in a reduced form as illustrated with the alternate long and two short dashes line of FIG. 7 (part with oblique lines), and the bottom-end part thereof comes at a position on the upper side of the ABS-T line, i.e., at a position on an ABS-OE line. Therefore, as in the above-described case, when the flying surface S is polished to the bottom end of the band-like part 14 (see the arrow A), the end part of the recording element 11 comes on the ABS-OE line, which is the upper side than the ABS-T line that is the initial target position of the polishing. The other end side of the neck height comes at a still upper position by over-etching. As a result, neck height H' with over-etching comes to be almost the same as the neck height H that is the ideal length.

Figure 8:
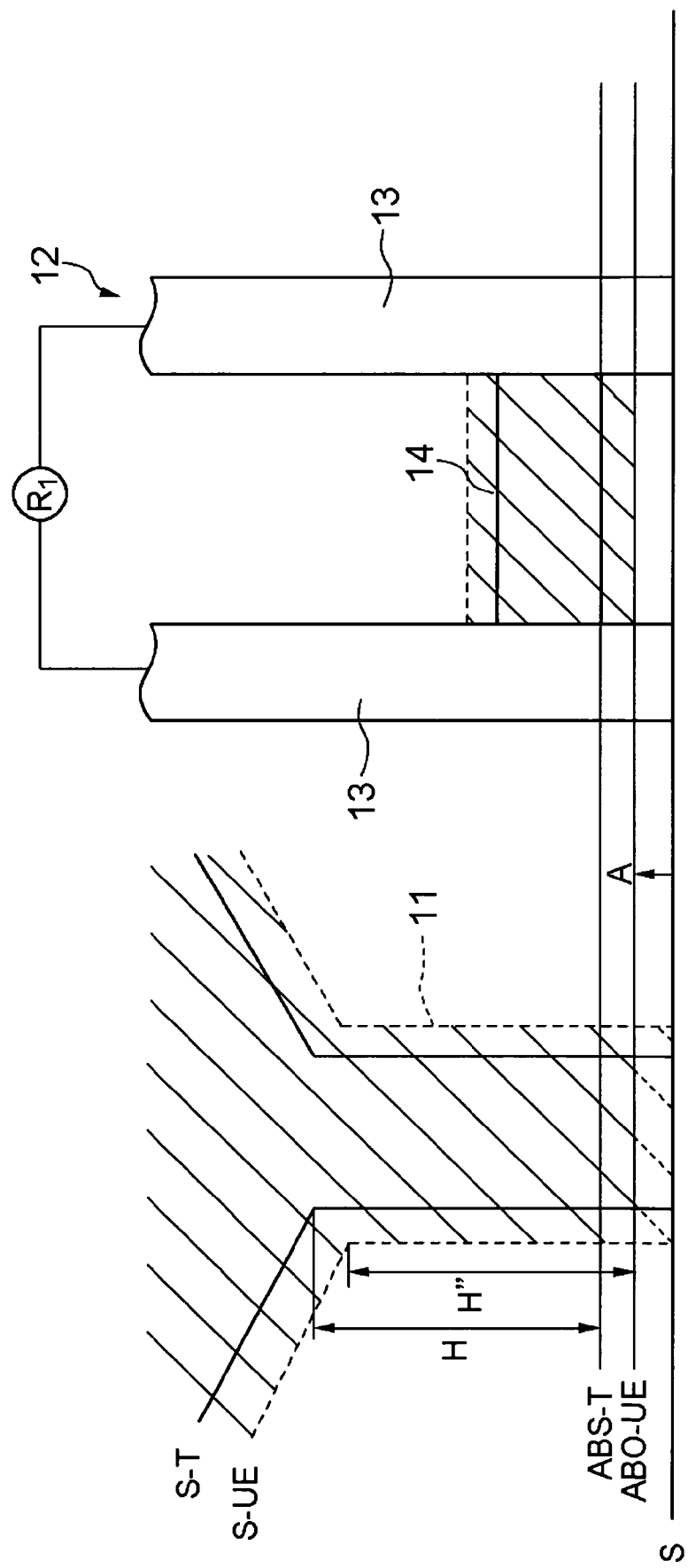
FIG. 8 is an illustration showing the structure of the recording-element forming layer and a state at the time of polishing.

Further, in a case of under-etching (see part with oblique lines) as shown with a dotted line S-UE of FIG. 8, the length of the neck height becomes too short if the flying surface S is polished to the ABS-T line that is the initial target position of the polishing. However, as described above, the band-like part 14 is also under-etched when the recording-element polish amount detecting sensor 12 is formed on the same layer 10 as that of the recording element 11 and it is shaped simultaneously with the etching of the recording element 11. Thereby, the band-like part 14 comes to be in a wide form as illustrated with the dotted line of FIG. 8 (part with oblique lines), and the bottom-end part thereof comes at a position on the lower side of the ABS-T line, i.e., at a position on an ABS-UE line. Therefore, as in the above-described case, when the flying surface S is polished to the bottom end of the band-like part 14 (see the arrow A), the end part of the recording element 11 comes on the ABS-UE line, which is the lower side than the ABS-T line that is the initial target position of the polishing. The other end side of the neck height comes at a still lower position by under-etching. As a result, neck height H" with under-etching comes to be almost the same as the neck height H that is the ideal length.

As described above, by providing the recording-element polish amount detecting sensor 12 on the same layer as that of the recording element 11 in the stacked-layer forming step by means of etching, milling, and the like, shift in the forms generated at the time of shaping the recording element 11 is reflected upon the form of the band-like part 14 of the sensor 12. That is, the form of the recording-element polish amount detecting sensor 12 is shaped in accordance with the length of the shaped recording element 11, which changes when the position of one end (the base part located on the opposite side of the tip side) to be the neck height H of the recording element 11 is shifted. Therefore, the neck height H as the element height of the recording element 11 can be shaped to be uniform at all times through polishing the flying surface according to the output value of the sensor 12 in the lapping step. Note here that the form of the recording-element polish amount detecting sensor 12, particularly the form of the band-like part 14, is not limited to the one shown in the drawings.

However, the method described above is a method which adjusts the length of the recording element 11 only, and the reproducing element 21 comes to have the optimum length by performing polishing to the ABS-T line. Thus, as described above, when there is shift in the form of the recording element 11 and the position thereof is relatively shifted from that of the reproducing element 21, it is necessary to perform polishing by setting the flying surface S that is the polishing surface of the bar block 110 to be in a prescribed angle at the time of polishing. A method for setting the polishing angle will be described.

As described above, this embodiment further provides the reproducing-element polish amount detecting sensor 22 on the same layer as that of the reproducing element 21 in the stacked-layer forming step. The relative position shift between the recording element 11 and the reproducing element 21 can be detected through comparing the output values of the recording-element polish amount detecting sensor 12 and the reproducing-element polish amount detecting sensor 22.

Figure 9:
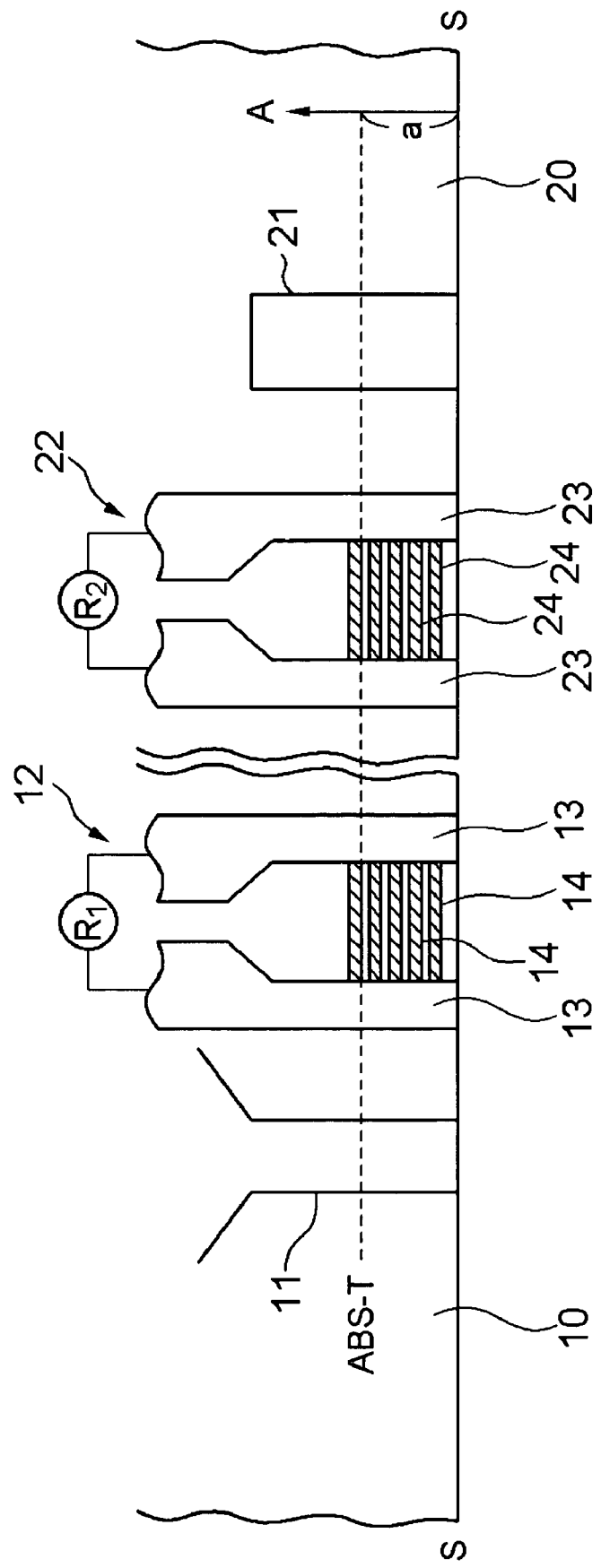
FIG. 9 is an illustration showing the structure of the reproducing-element forming layer, the structure of the recording-element forming layer, and a state at the time of polishing.

FIG. 9 illustrates the forming layer 10 of the recording element 11 and the forming layer 20 of the reproducing element 21 side by side, which are actually laminated. As shown in the drawing, the recording-element polish amount detecting sensor 12 formed on the forming layer 10 of the recording element 11 is formed to have a plurality of band-like parts 14 (parts with oblique lines) which are extended almost perpendicular to the polishing direction (an arrow A direction), i.e., almost in parallel to the flying surface S. Further, a pair of connection parts 13 extended in the polishing direction, which is provided perpendicular to the band-like parts 14, is connected to the both ends of the band-like parts 14, and the sensor itself is formed substantially in a ladder form. This makes it possible to detect the resistance value via the connection parts 13, when a plurality of band-like parts 14 are connected in parallel. Further, in the same manner, the reproducing-element polish amount detecting sensor 22 formed on the forming layer 20 of the reproducing element 21 is formed to have a plurality of band-like parts 24 which are extended almost perpendicular to the polishing direction, i.e., almost in parallel to the flying surface S. Further, a pair of connection parts 23 extended in the polishing direction, which is provided perpendicular to the band-like parts 24, is connected to the both ends of the band-like parts 24, and the sensor itself is formed substantially in a ladder form. This makes it possible to detect the resistance value via the connection parts 23, when a plurality of band-like parts 24 are connected in parallel.

Each of the substantially ladder-form sensors 12 and 22 described above is formed to be almost in a same shape. Particularly, each of the band-like parts 14 and 24 is formed in such a manner that the respective positions thereof from the flying surface S become the same. For example, positions of the band-like parts 14 and 24 located closest to the flying surface S side, which are the end parts of the sensors 12 and 22, are to be consistent with each other. Further, as shown in FIG. 9, when the polishing is performed from the position of the flying surface S towards the direction of arrow A, the lengths of the recording element 11 and the reproducing element 21 become appropriate at the position shown with the ABS-T line. However, as described above, there may generate shift in the form of the recording element 11 generated at the time of shaping. Thus, each of the ladder-form sensors 12 and 22, particularly the shapes of the band-like parts 14 and 24, may not necessarily be in the same shape. Therefore, the output values from each of the sensors 12 and 22 at the time of polishing, which fall within a polishing range to the ABS-T line (indicated with a code "a"), are used for detecting the position shift between the recording element 11 and the reproducing element 21.

Figure 10:
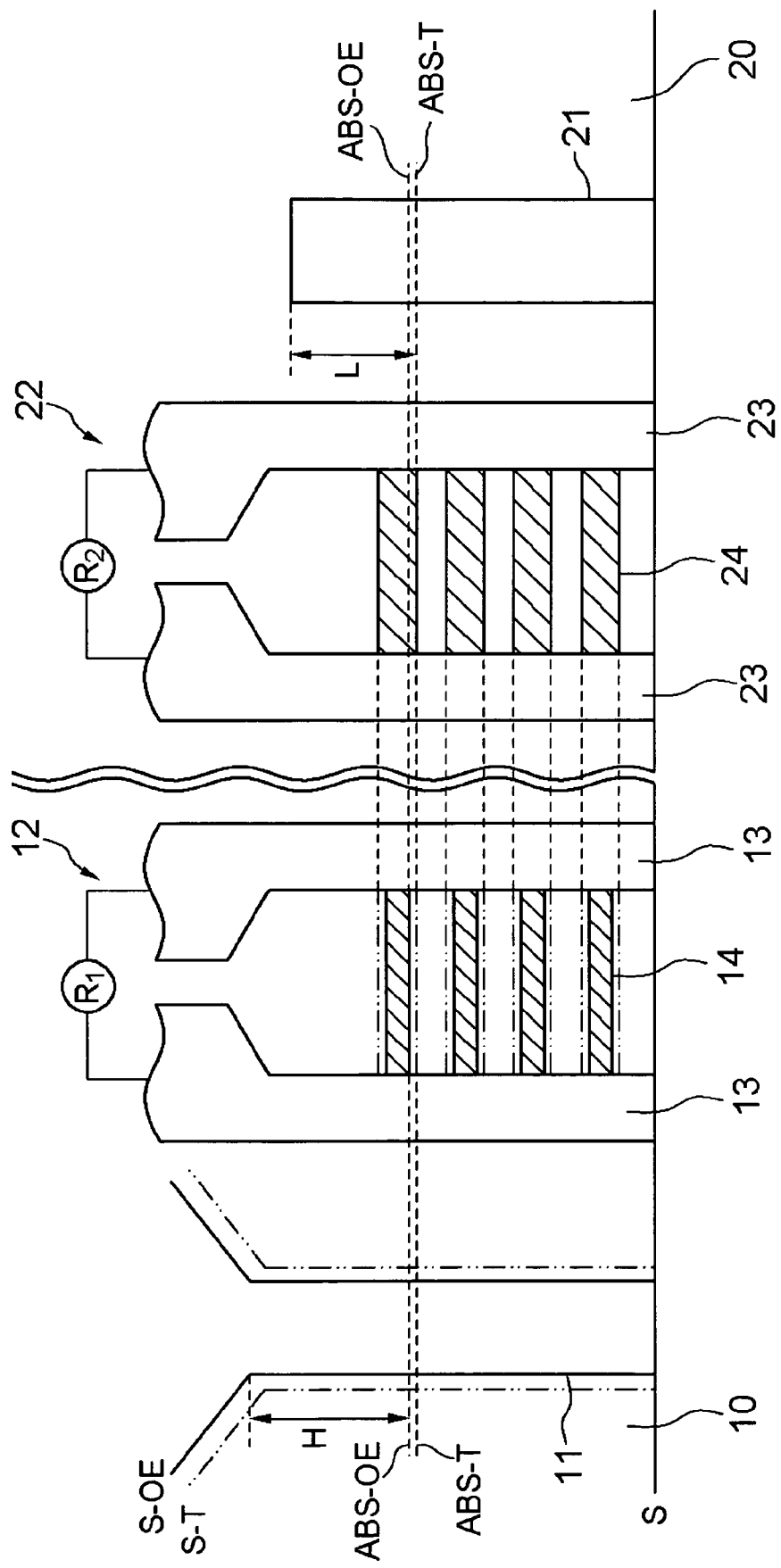
FIG. 10 is an illustration showing the structure of the reproducing-element forming layer, the structure of the recording-element forming layer, and a state at the time of polishing.
Figure 11:
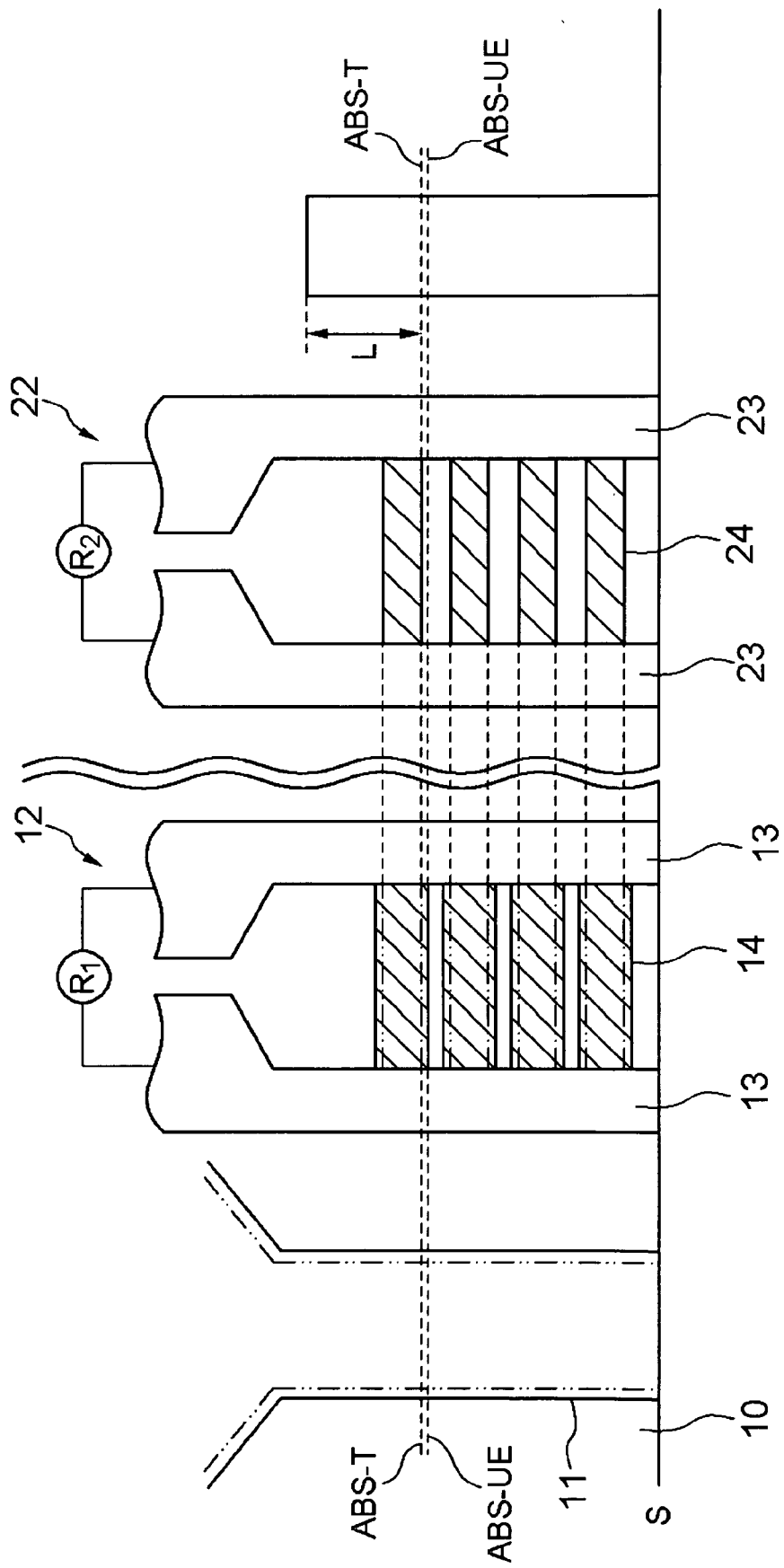
FIG. 11 is an illustration showing the structure of the reproducing-element forming layer, the structure of the recording-element forming layer, and a state at the time of polishing.

Explanations will continue further by referring to FIG. 10 and FIG. 11. First, FIG. 10 shows a case where the recording element 11 is over-etched to a form shown with the solid line of S-OE in the stacked-layer forming step, even though the recording element 11 is originally planed to be etched to a form shown with the alternate long and two short dashes line of S-T. With that condition, the band-like part 14 of the recording-element detecting sensor 12 is also formed to have a narrow width because of the over-etching. In the meantime, it is assumed that the band-like part 24 of the reproducing element detecting sensor 22 on the other layer is shaped to a target form. In that case, as described above, the neck height H of the recording element 11 can be adjusted to a proper height, by polishing it to the lower end of the band-like part 14 positioned on the upper side, i.e., by polishing it to the ABS-OE line, when setting the neck height H of the recording element 11 in the lapping step. With this, however, the length L of the reproducing element 21 becomes inappropriate. Thus, as shown in FIG. 14B, it is necessary to polish the flying surface S by tilting it so as to have different polish amounts for the recording element 11 and the reproducing element 21.

Figure 12:
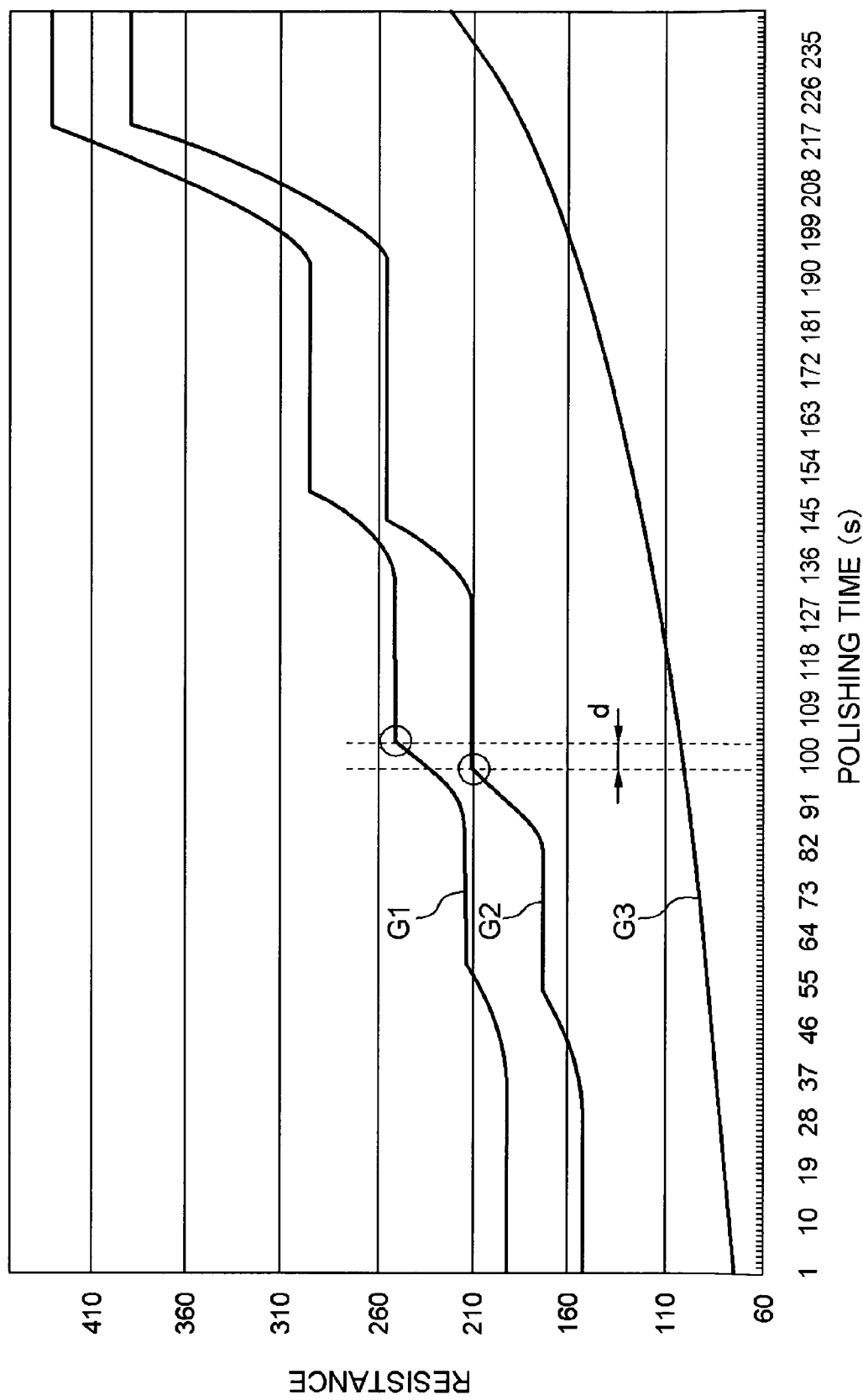
FIG. 12 is a graph showing outputs of a reproducing-element polish amount detecting sensor and a recording-element polish amount detecting sensor.

Thereby, each of the output values of the respective polish-amount detecting sensors 12 and 22 in the initial polishing stage described above (polishing range illustrated with code "a" in FIG. 9) is used. FIG. 12 shows a graph of the output values of each of the sensors 12 and 22. In this graph, a chart G1 shows resistance values as output values from the recording-element polish amount detecting sensor 12, and a chart G2 shows resistance values as output values from the reproducing-element polish amount detecting sensor 22. A chart G3 shows resistance values when the sensors 12 and 22 are not formed in a ladder form as in FIG. 9 and the like, but formed in a single band form as shown in FIG. 6 and the like.

As shown in the graph, the resistance values change to increase to form quadratic curves during the time where the band-like parts 14, 24 of the respective sensors 12, 22 are being polished. Thus, the charts G1 and G2 form the curves. However, in the areas between each of the band-like parts 14, 24 where there is no band-like parts 14, 24, there is no change in the resistance values. Thus, the charts G1 and G2 are flat. Therefore, compared to the case of the chart G3, the position shift between the recording element 11 and the reproducing element 21 can be detected more easily through detecting boundaries of changes in the charts marked with circles in FIG. 12. FIG. 11 shows a case where the forming layer 10 of the recording element 11 is under-etched. In this case, a same graph as that of FIG. 12 can also be obtained.

As described above, FIG. 13 shows a state of polishing and the structure of the bar block where each of the polish-amount detecting sensors 12 and 22 is formed, when viewed from the flying surface side. As described above, in the magnetic head 101 part that is stacked on the wafer 100, the reproducing-element polish amount detecting sensor 22 is formed on the same layer as that of the reproducing element 21 and the recording-element polish amount detecting sensor 12 is formed on the same layer as that of the recording element 11 (see dotted lines in FIG. 13). Further, a DFH (dynamic flying height) element 31 for shortening the distance between the magnetic head and the disk through expansion by the heat of a heater is provided on the upper layer. Furthermore, a pad 41 (terminal part) for the recording element 11, a pad 42 (terminal part) for the reproducing element 21, and a pad 43 (terminal part) for the DFH are formed on the top layer. These are the pads used by being connected to the magnetic head slider, even after the bar block is cut into the magnetic head sliders 120 later. Further, a pad 44 (terminal part) that is connected to one of the output terminals of the recording-element polish amount detecting sensor 12 is provided on the top layer. Furthermore, the other terminal parts of the recording-element and reproducing-element polish amount detecting sensors 12 and 22 are electrically connected to the wafer 100 side and grounded. A pad 45 (terminal part) for the grounding is also provided. One of the output terminals of the reproducing-element polish amount detecting sensor 22 is connected to the DFH pad 43 described above. One of the output terminals of the respective sensors 12 and 22 may also be connected to the other pads. Connection wirings for each of the above-described sensors 12 and 22 are formed through stacking layers at the time of carrying out the stacked-layer forming step.

Then, during the lapping step where the flying surface S shown in FIG. 14 is being polished to the arrow A direction (step S5 of FIG. 19), the output values from each of the pads 43, 44, and 45 connected to each of the sensors 12 and 22 are detected by the polish amount controller 208. Thereafter, the output values from the respective sensors 12 and 22 are compared to detect the shift amount in the positions of the recording element 11 and the reproducing element 21. That is, in the case of FIG. 10 and FIG. 11, the recording element 11 may come to have the appropriate length H by being polished to the ABS-OE line or the ABS-UE line, while the reproducing element 21 comes to have the appropriate length L by being polished to the ABS-T line. In order to polish both the recording element 11 and the reproducing element 21 to the ideal lengths with such case, a tilt angle of the bar block 110 with respect to the lapping unit 205 is set in accordance with the shift amount in the positions of the elements 11 and 21 as in an angle θ shown in FIG. 14B (step S6 in FIG. 19). Then, polishing is continued at that angle so as to adjust the recording element 11 and the reproducing element 21 to be in the ideal lengths H and L (step S7 of FIG. 19).

Thereafter, the bar block 110 is cut into the individual magnetic head sliders 120 in the slider cutting step. At this time, the bar block 110 is cut at the dotted-line sections shown in FIG. 13 to cut out the pad parts shown with reference numerals 44 and 45 which are not connected to any element of the magnetic head 101, as shown in FIG. 15. As a result, the reproducing-element polish amount detecting sensor 22 and the recording-element polish amount detecting sensor 12 are also cut out so as not to be included in the magnetic head slider 120.

By going through the process described above, the embodiment forms, on the same layers as those of the reproducing element 21 and the recording element 12, respectively, the reproducing-element polish amount detecting sensor 22 and the recording-element polish amount detecting sensor 12 for detecting the polish amounts in the lapping step, and refers to the output values from each sensor. Thereby, it is possible to detect the shift in the positions of the reproducing element 21 and the recording element 11, which vary depending on the forming conditions of each element. Through continuing the polishing by setting the tilt angle of the flying surface to be polished based on the detected shift amount, the recording element 11 and the reproducing element 21 can both be adjusted to the respective appropriate lengths simultaneously.

Therefore, the embodiment is preferably used particularly when manufacturing the perpenducular-recording type magnetic head sliders 120 which require highly precise adjustment in the lengths of both the recording element 11 and the reproducing element 21.

Figure 16A:
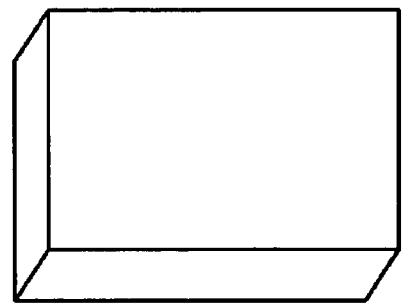
FIGS. 16 (A)-(C) show illustrations for describing a relation between the thickness of the sensor and the resistance.
Figure 16B:
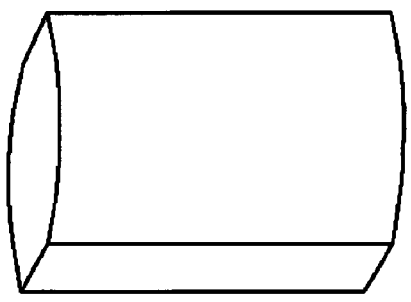
Figure 16C:
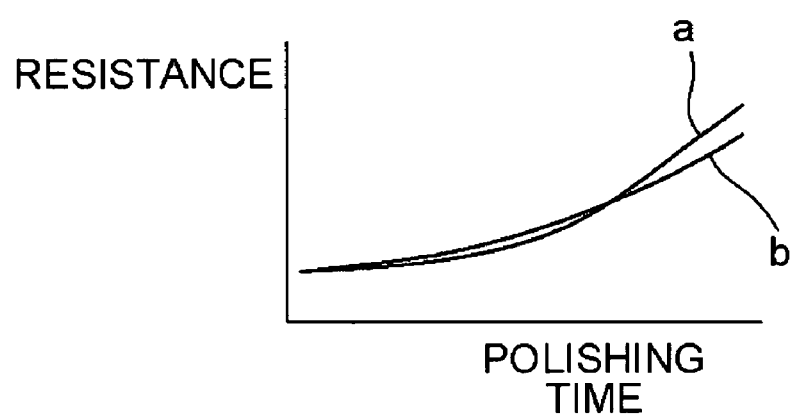

Particularly, by forming the band-like parts 14, 24 of the respective polish amount detecting sensors 12, 22 in substantially a ladder form where a plurality of the band-like parts are arranged with space provided therebetween, changes in the resistance values at the time of polishing can be made gradual. Thus, the position shift between the recording element 11 and the reproducing element 21 can be detected easily. It is fine if the polish amount detecting sensors 12 and 22 are formed to have uniform thickness as shown in FIG. 16A. However, it is difficult to form them uniformly in all the magnetic heads. When the thickness is not uniform as in FIG. 16B, the resistance dependency of the polishing time varies as shown in FIG. 16C. Even in such case, changes in the output values as the resistance values can be made gradual as in the above-described case, with the use of the sensors having a plurality of band-like parts 14 and 24 which are perpendicular to the polishing direction. Therefore, the position shift generated when stacking each of the elements 11 and 21 can be detected more precisely.

Note here that the above-described reproducing element detecting sensor 22 and recording-element detecting sensor 12 are not limited to be in the above-described forms. Modification examples of the sensors 12 and 22 are shown in FIG. 17 and FIG. 18. While FIG. 17 and FIG. 18 only show the form of the recording-element polish amount detecting sensor 12, the form of the reproducing-element polish amount detecting sensor 22 is also the same. Further, the forms of the band-like part 14 in each example shown in FIG. 17 are different, which are shown with oblique lines. The ABS-T line illustrated with a dotted line in FIG. 17 shows the position at which the reproducing element 21 and the recording element 11 come to have the ideal lengths.

First, in the example shown in FIG. 17A, the band-like part 14 is formed uniformly from the flying surface S as the polishing surface to a point above the ABS-T line. In that case, changes in the resistance value at the time of polishing forms a curve as in the chart G3 shown in FIG. 12. However, it is possible to detect the position shift between the recording element 11 and the reproducing element 21 through comparing the output values, even though the precision thereof is low. Through continuing the polishing by setting the polishing angle based on the position shift, both elements can be adjusted to the respective appropriate lengths simultaneously. For adjusting the element lengths, the lengths may be determined by referring to the output value of the band-like part 14 at the time of polishing.

Further, in the example shown in FIG. 17B, there are four band-like parts 14 formed from the flying surface S side with a space provided therebetween. The band-like part 14 in the vicinity of the ABS-T line is formed to across over the ABS-T line. In that case, the position shift between the reproducing element 21 and the recording element 11 is detected by several numbers of band-like parts 14 on the flying surface S side, and polishing is continued by setting the polishing angle based thereupon. Then, both elements can be set to the appropriate lengths based on the change in the output value obtained during the time when the band-like part 14 formed to across over the ABS-T line is being polished.

Figures 18A, 18B:
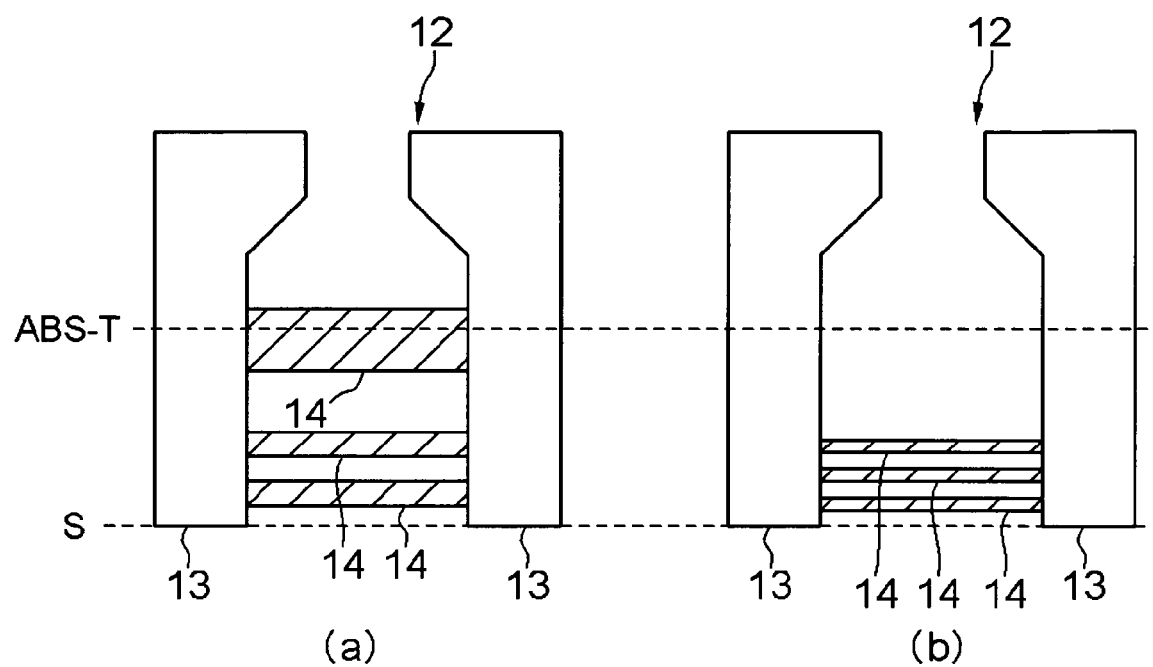
FIGS. 18 (A) and (B) are an illustration showing a modification example of the reproducing-element polish amount detecting sensor and the recording-element polish amount detecting sensor.

In the example shown in FIG. 18A, there are two band-like parts 14 provided in the vicinity of the flying surface S and one band-like part 14 provided in the vicinity of the ABS-T line. Through providing a larger number of band-like parts 14 on the flying surface S side that is the polishing surface side, the position shift between the reproducing element 21 and the recording element 11 can be detected at an early stage from the start of polishing, i.e., at a stage where the reproducing element 21 and the recording element 11 are still long. Thus, the polishing angle can be set at the early stage of polishing. Then, by continuing the polishing, both elements can be set to the appropriate lengths based on the change in the output value obtained when the band-like part 14 that is provided to across over the ABS-T line is being polished. As described, the polishing angle can be adjusted at the stage where each of the elements 11 and 21 is still long. Therefore, versatility of adjustment in the lengths is increased, so that the lengths of the elements can be set with still higher precision.

Further, in the example shown in FIG. 18B, there are only three band-like parts 14 provided on the lower end side. As described, through providing more band-like parts 14 only on lower end side, the position shift between the reproducing element 21 and the recording element 11 can be detected at an early stage from the start of polishing. Thus, the polishing angle can be set based thereupon. Further, since the number of band-like parts 14 itself is small, the resistance value to be detected becomes high. This makes it possible to detect the change easily. Therefore, accuracy for detecting the position shift can be improved. After setting the polishing angle, polishing is to be continued by controlling the polishing time, etc., so as to set both elements to the appropriate lengths.

The recording-element polish amount detecting sensor 12 and the reproducing-element polish amount detecting sensor 22 are not limited to be in the forms that are illustrated in each drawing as a way of examples. Those sensors may be in any kinds of forms. That is, the band-like parts 14, 24 provided to the respective sensors 12, 22 may have any widths, and the forming positions and the number of the sensors are not limited, either.

Second Embodiment

Next, a second embodiment of the present invention will be described by referring to FIG. 23-FIG. 29. In this embodiment, basically, magnetic head sliders are manufactured by the magnetic head slider manufacturing method described above. However, the second embodiment further includes a step for adjusting the lengths of the recording element 11 and the reproducing element 21 with still higher precision. The step added to the first embodiment will be described in detail hereinafter.

First, in the stacked-layer forming step of the second embodiment, a pair of polishing-end detecting sensors having the same structure as the above-described recording-element polish amount detecting sensor 12 is formed on the same layer as that of the recording element 11 or on another layer. The recording-element polish amount detecting sensor 12 and the reproducing-element polish amount detecting sensor 22 may also be used as a pair of polishing-end detecting sensors. However, described in the followings is a case of forming another pair of polishing-end detecting sensors. The pair of polishing-end detecting sensors may be formed on any layers. Further, each of the pair of the polishing-end detecting sensors may be formed on the same layer or different layers. Furthermore, as in the case of the above-described recording-element polish amount detecting sensor 12 and the like, it is preferable to form the pair of polishing-end detecting sensors in the part that is cut out from the bar block, as shown in FIG. 13 and FIG. 15.

FIG. 23 shows an example of a form of the polishing-end detecting sensor. As shown in FIGS. 23A, 23B, 23C, basically, as in the case of the above-described recording-element polish amount detecting sensor 12, the polishing-end detecting sensor is shaped into a form having band-like parts 31b, 32b, 33b extended in parallel to the polishing surface S and having respective pairs of connection parts 31a, 32a, 33a, which are connected in both ends of respective band-like parts 31b, 32b, 33b and extended towards the polishing direction (arrow A direction). The forms of the band-like parts 31b, 32b, and 33b (resistances) are reduced in accordance with the polishing amount, by being polished from the polishing surface S towards the polishing direction (arrow A direction) along with the recording element 11 (not shown). Therefore, it is possible to detect the polishing amount by detecting the resistance values of the band-like parts 31b, 32b, 33b by each of the sensors 31, 32, 33 via the connection parts 31a, 32a, 33a. For detecting the resistance values, output terminals of each of the polishing-end detecting sensors may be stacked by being connected to each pad of the magnetic head sliders, as in the case of the above-described polish amount detecting sensors 12 and 22. This makes it possible to detect the resistance values through each pad.

Figure 24:
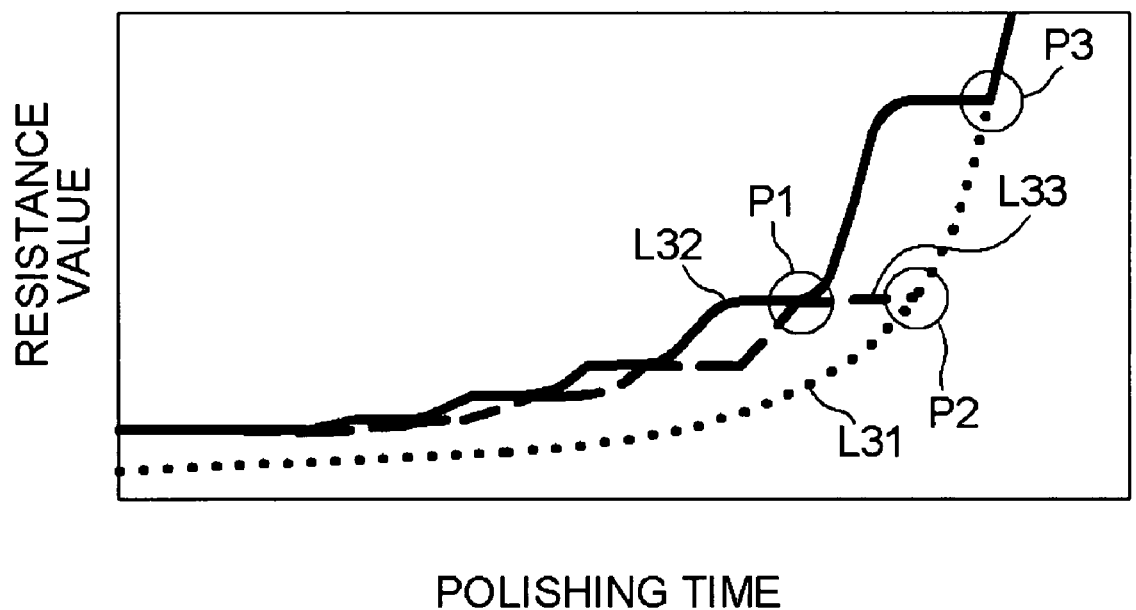
FIG. 24 is a graph showing changes in the resistance values of each polishing-end detecting sensor disclosed in FIG. 23.

When each of the polishing-end detecting sensors 31, 32, 33 is formed in various forms as in FIG. 23, the resistance values (output values) detected by each of the polishing-end detecting sensors 31, 32, and 33 vary. FIG. 24 shows changes in the resistance values of each of the sensors 31, 32, and 33 at the time of polishing. In this graph, a chart L31 indicates the resistance value of the sensor 31, a chart L32 indicates the resistance value of the sensor 32, and a chart L33 indicates the resistance value of the sensor 33. As shown in the graph, the sensor 31 has only one band-like part 31b, so that the resistance value thereof increases in a quadratic functional manner as the polishing proceeds. The sensors 32 and 33 have a plurality of band-like parts 32b and 33b, respectively. Thus, the resistance values thereof increase in a quadratic functional manner as the polishing proceeds when the band-like parts 32b, 33b are being polished, while there is no change in the resistance values (constant resistance values) when polishing the part between the band-like parts 32b and the part between the band-like parts 33b. For the sensor 32 and the sensor 33, the forming positions of the respective band-like parts 32 and 33b are different, and those parts are formed alternately along the polishing direction A. That is, when there is a band-like part of one of the sensors formed at a given position along the polishing direction, a band-like part of the other sensor is not formed in the same position.

Looking at the graph of FIG. 24, each of the sensors 31, 32, 33 is formed to have the same resistance values at a prescribed polishing time, i.e., with a prescribed polishing amount. For example, the resistance values of the sensor 32 and the sensor 33 coincide with each other at a polishing amount P1. Further, the resistance values of the sensor 31 and the sensor 33 coincide with each other at a polishing amount P2. The resistance values of the sensor 31 and the sensor 32 coincide with each other at a polishing amount P3. At the polishing amount P3, the resistance values of all the sensors 31, 32, and 33 coincide with each other.

As described above, the polishing-end detecting sensors 31, 32, and 33 of the second embodiment are formed to have such characteristics that the resistance values thereof coincide with each other with a prescribed polish amount. Therefore, it is possible to adjust the lengths of the recording element 12 and the like to desired lengths with high precision through shaping the two sensors out of the sensors 31, 32, and 33 in the above-described forms in such a manner that the recording element 12 and the like can have the optimum length with the polishing amount with which the resistance values thereof coincide, and stopping the polishing in the lapping step at the point where the resistance values of the pair of polishing-end detecting sensors coincide with each other. Hereinafter, the pair of polishing-end detecting sensors will further be described by referring to a concretive example.

Figure 25A:
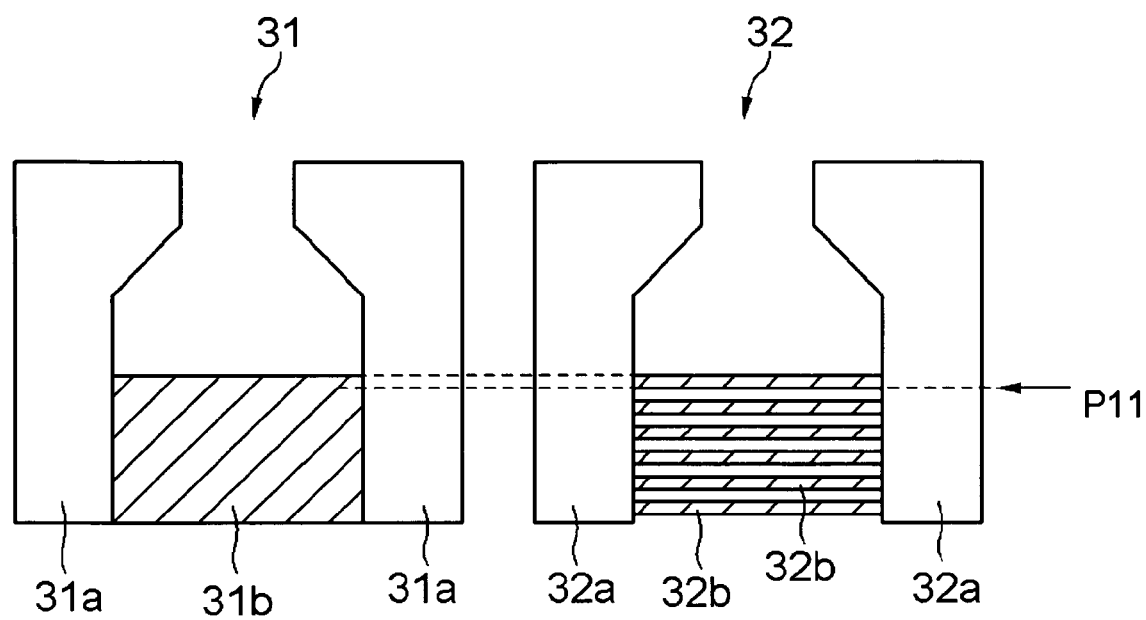
FIG. 25A is an illustration showing an example of a pair of polishing-end detecting sensors according to the second embodiment.
Figure 25B:
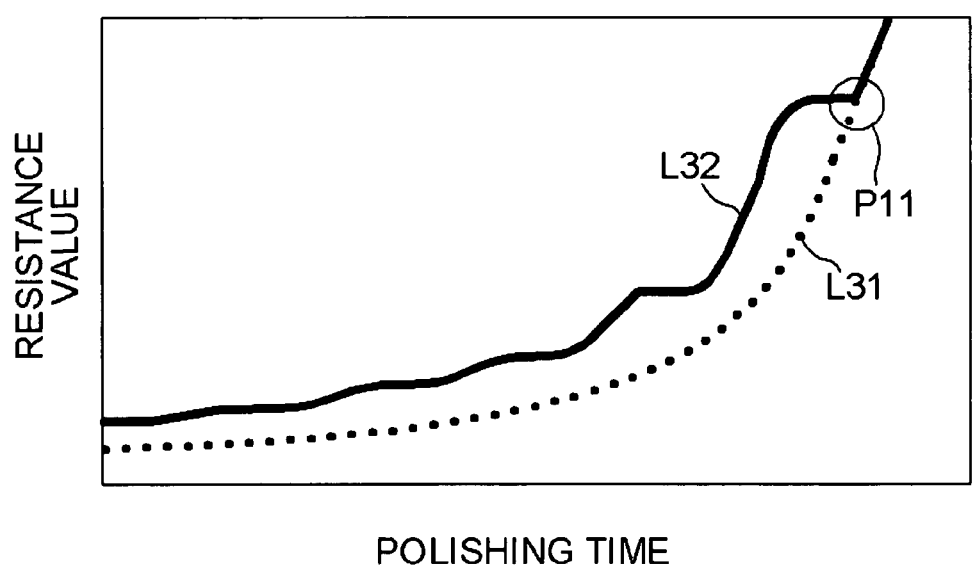
FIG. 25B is a graph showing changes in the resistance value of the sensors disclosed in FIG. 25A.

In the example shown in FIG. 25A, the polishing-end detecting sensor 31 and the polishing-end detecting sensor 32 are formed as a pair of polishing-end detecting sensors in the stacked-layer forming step. This makes it possible to form a bar block having the pair of the polishing-end detecting sensors 31 and 32. The bar block is polished by the lapping step to adjust the lengths of the recording element 12 and the like. FIG. 25B shows the state of changes in the resistance values of each of the polishing-end detecting sensors 31 and 32 in the lapping step. As in the graph of FIG. 25B, when continuing to polish each of the sensors 31, 32, the resistance values of each of the sensors 31, 32 coincide with each other at a polishing amount P11. Thus, the polishing is ended by detecting that point as a polishing-end position. This allows the lengths of the elements to be adjusted more precisely.

Figure 26A:
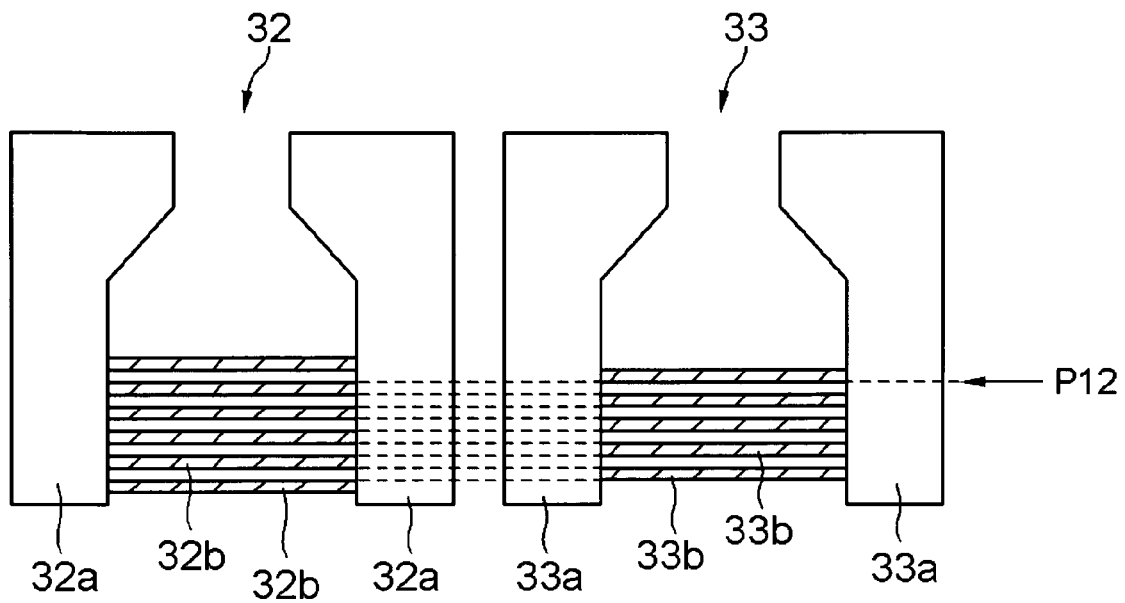
FIG. 26A is an illustration showing an example of the pair of polishing-end detecting sensors according to the second embodiment.
Figure 26B:
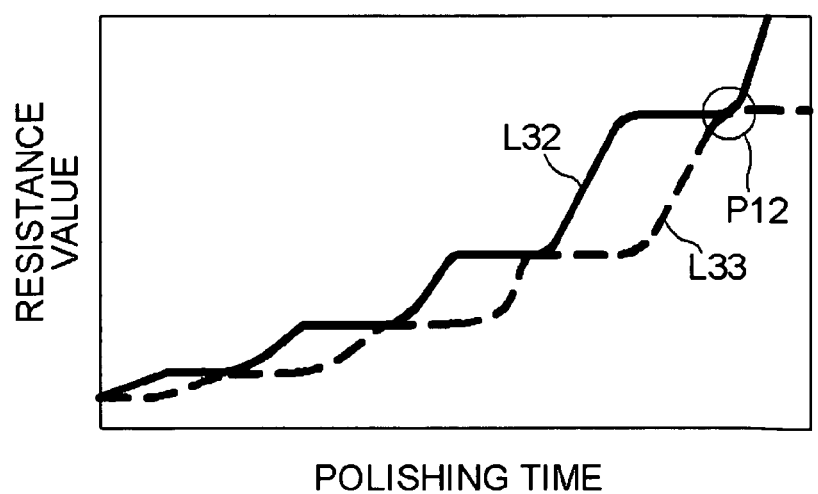
FIG. 26B is a graph showing changes in the resistance value of the sensors disclosed in FIG. 26A.

In the example shown in FIG. 26A, the polishing-end detecting sensor 32 and the polishing-end detecting sensor 33 are formed as a pair of polishing-end detecting sensors in the stacked-layer forming step. The sensors 32 and 33 are formed in the same manner as the structures described above in respect that the band-like parts 33b are provided alternately with the band-like parts 32b of the sensor 32, even though the form of the sensor 33 is slightly different. This makes it possible to form a bar block having the pair of polishing-end detecting sensors 32 and 33. The bar block is polished by the lapping step to adjust the lengths of the recording element 12 and the like. FIG. 26B shows the state of changes in the resistance values of each of the polishing-end detecting sensors 32 and 33 in the lapping step. As in the graph of FIG. 26B, when continuing to polish each of the sensors 32, 33, the resistance values of each of the sensors 32, 33 coincide with each other at a polishing amount P12. Thus, the polishing is ended by detecting that point as a polishing-end position. This allows the lengths of the elements to be adjusted more precisely.

Figure 27A:
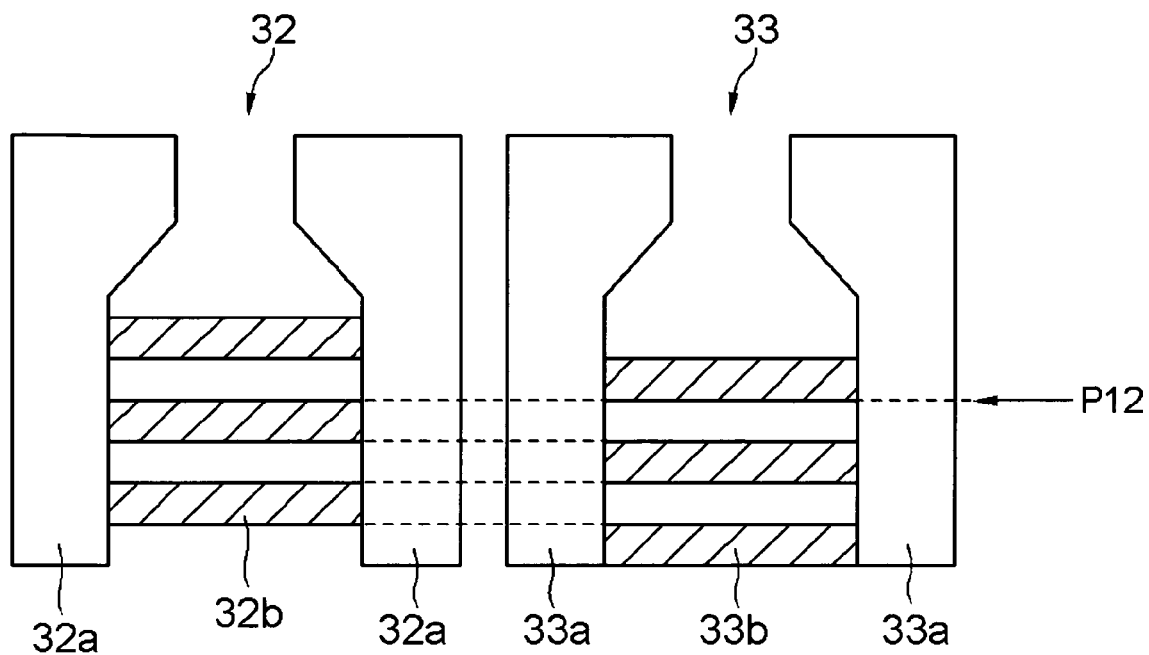
FIG. 27A is an enlarged view showing an example of the pair of polishing-end detecting sensors disclosed in FIG. 26.
Figure 27B:
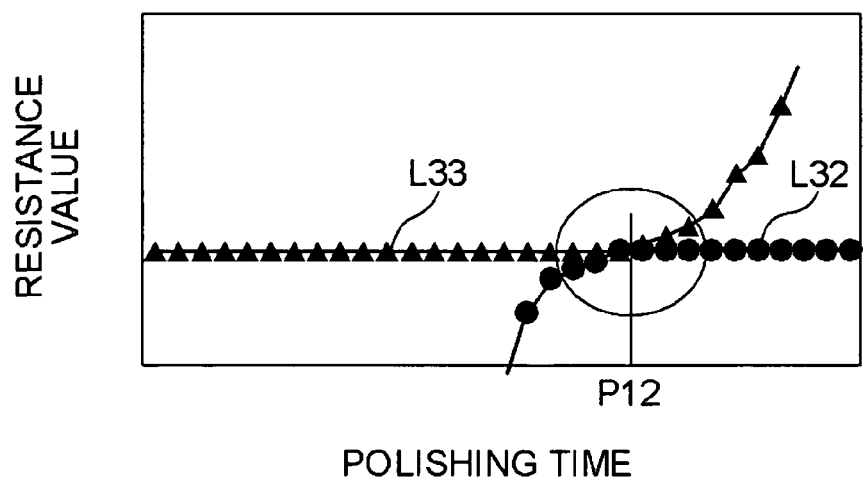
FIG. 27B is an enlarged graph showing changes in the resistance value of the sensors disclosed in FIG. 27A.

Here, more detailed explanations will be provided by referring to FIG. 27-FIG. 29 which show enlarged views of each drawing of FIG. 26. FIG. 27 shows a case where the pair of polishing-end detecting sensors 32 and 33 is etched to the target forms. In that case, as shown in FIG. 27A, the band-like parts 32b, 33b of the respective sensors 32, 33 are clearly formed in an alternate manner without being overlapped with each other in the polishing direction. When continuing the polishing of such pair of polishing-end detecting sensors 32, 33, it is possible to detect that the resistance values of each of the sensors 32, 33 coincide with each other almost at one point, i.e., at the polishing position P12, as shown in FIG. 27B. This makes it possible to adjust the element lengths more precisely through ending the polishing upon detecting the match of the resistance values in the lapping step.

Figure 28A:
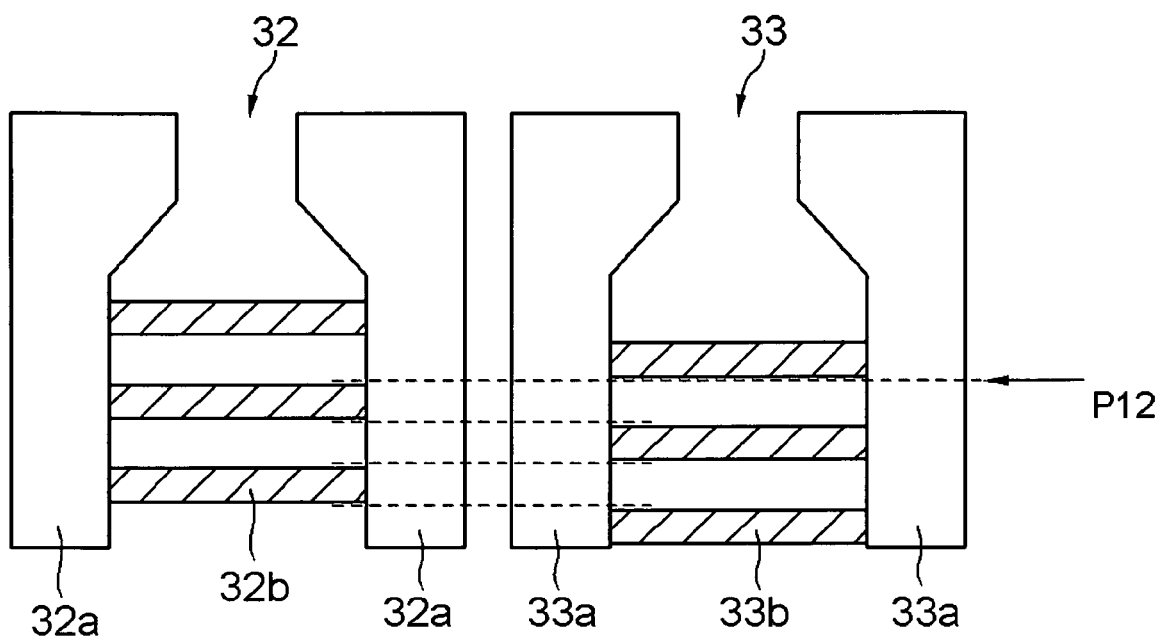
FIG. 28A is an enlarged view showing an example of the pair of polishing-end detecting sensors disclosed in FIG. 26.
Figure 28B:
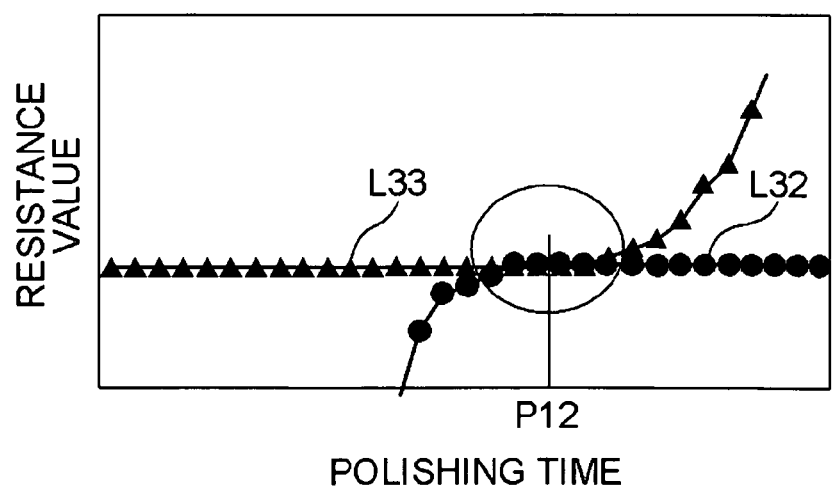
FIG. 28B is an enlarged graph showing changes in the resistance value of the sensors disclosed in FIG. 28A.

Further, FIG. 28 shows a case where the pair of polishing-end detecting sensors 32, 33 is over-etched when shaping the sensors by etching, i.e., a case where the sensors are etched more than the target forms. In that case, as shown in FIG. 28A, each of the band-like parts 32b and 33b is formed smaller than the target forms, so that the positions of the areas having no band-like parts 32b, 33b of the respective polishing-end detecting sensors 32, 33 may overlap with each other along the polishing direction. Further, it can be seen that there is no band-like parts 32b, 33b formed in both sensors 32, 33 at the polishing position shown with P12 (see dotted lines). When continuing the polishing of such pair of polishing-end detecting sensors 32, 33, the resistance values of each of the sensors 32, 33 can coincide with each other also before and after the polishing position P12, as shown in FIG. 28B. That is, the state where the resistance values of both sensors 32 and 33 are consistent can continue for a prescribed length of time. In that case, the intermediate point of the section where the resistance values are consistent is detected as the polishing-end position. For the intermediate point of the section where the resistance values are consistent, it is estimated in advance that how long after the polishing is continued from the point where the resistance values become consistent reaches the intermediate point, based on the resistance values measured in each of the band-like parts 32b, 33b which have already been polished, for example. Based on the estimation, it is detected that the polishing position has reached the intermediate point of the section where the resistance values become consistent in the vicinity of the polishing-end position, and the polishing is ended.

Figure 29A:
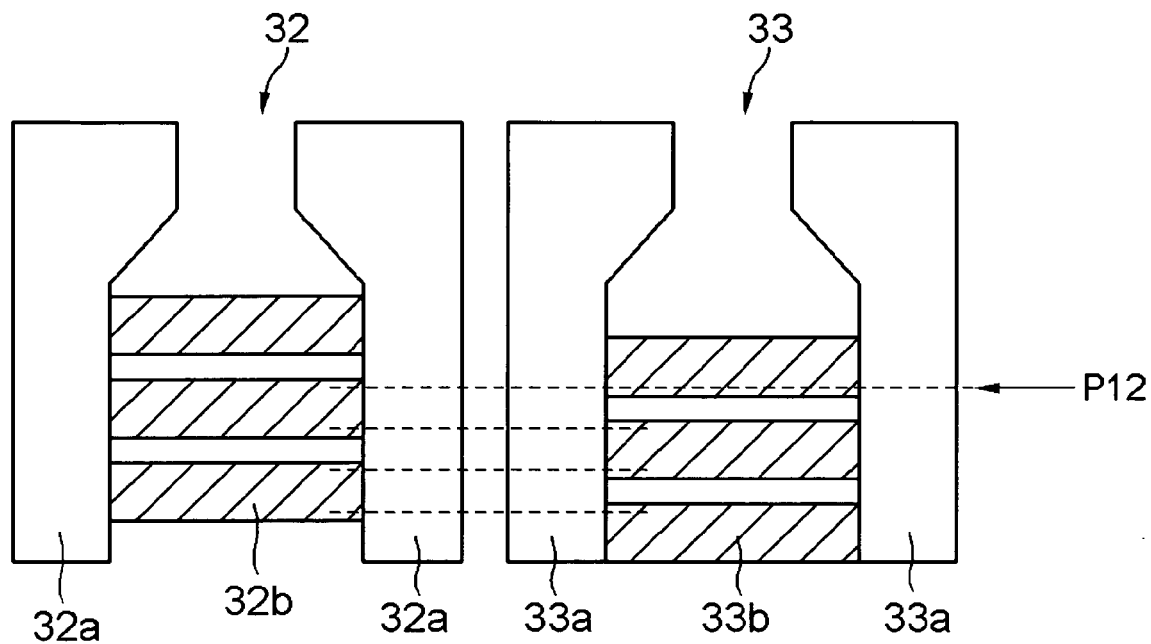
FIG. 29A is an enlarged view showing an example of the pair of polishing-end detecting sensors disclosed in FIG. 26.
Figure 29B:
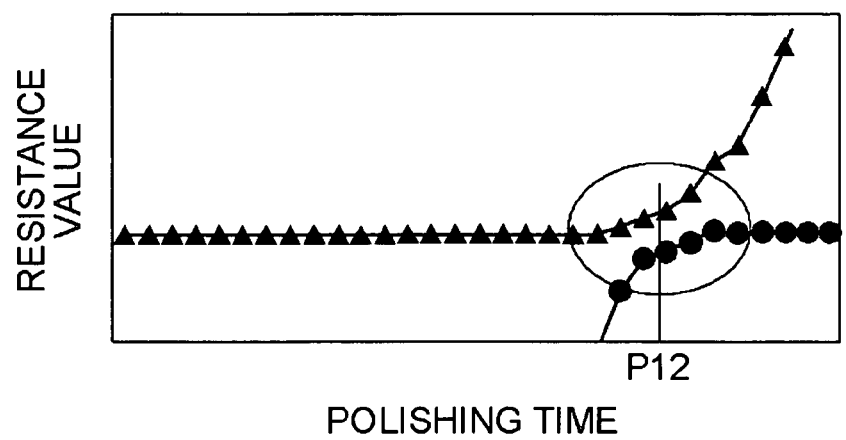
FIG. 29B is an enlarged graph showing changes in the resistance value of the sensors disclosed in FIG. 29A.

Further, FIG. 28 shows a case where the pair of polishing-end detecting sensors 32, 33 is under-etched when shaping the sensors by etching, i.e., a case where the sensors are etched less than the target forms. In that case, as shown in FIG. 29A, each of the band-like parts 32b and 33b is formed larger than the target forms, so that the positions of the band-like parts 32b, 33b of the respective polishing-end detecting sensors 32, 33 may overlap with each other along the polishing direction. Further, it can be seen that the band-like parts 32b, 33b overlap with each other in both sensors 32, 33 at the polishing position shown with P12 (see dotted lines). When continuing the polishing of such pair of polishing-end detecting sensors 32, 33, the resistance values of each of the sensors 32, 33 cannot coincide with each other completely even at the polishing position P12, as shown in FIG. 29B. In that case, when a difference between each of the resistance values falls within a tolerable range that is set in advance and the difference becomes the minimum, it is judged that each of the resistance values substantially coincide with each other. That point is detected as the polishing-end position. The tolerable range of the difference between the resistance values where the resistance values are judged as substantially consistent and the minimum value of the difference are estimated in advance based on the resistance values measured in each of the band-like parts 32b, 33b which have already been polished, for example. Based on the estimation, the polishing is ended when the difference between each of the resistance values substantially coincide with each other in the vicinity of the polishing-end position P12.

As described above, it is desirable for the pair of polishing-end detecting sensors to be formed on the same layer, considering the influences of the over-etching and under-etching that may occur at the time of shaping. Further, while the sensors for adjusting the recording element 11 have been described in the above as a way of example, those may be provided as the sensors for adjusting the length of the reproducing element 21.

While the case of stacking the pair of polishing-end detecting sensors anew and mounting those to the bar block has been described in the above, the recording-element polish amount detecting sensor 12 and the reproducing-element polish amount detecting sensor 22 may also be used as the pair of polishing-end detecting sensors. In that case, in the lower end side (polishing surface side) of each of the sensors 12, 22, band-like parts that utilize the resistance values at the time of polishing for detecting the position shift between the recording element 11 and the reproducing element 22 are formed as has been described in the first embodiment. Further, in the upper side of the respective sensors 12, 22, i.e., in the vicinity of the polishing-end position where the lengths of the recording element 11 and the reproducing element 21 are determined, each of the band-like parts is formed in such a manner that the resistance values of each sensor coincide with each other at the polishing-end position as described above. This makes it possible to reduce the number of sensors formed in the bar block, so that the cost can be cut. It is also possible to use the recording-element polish amount detecting sensor 12 or the reproducing-element polish amount detecting sensor 22 for one of the pair of polishing-end detecting sensors.

The manufacturing device of the present invention can be mounted to a disk device and utilized for manufacturing magnetic head sliders which record/reproduce data to/from disk. Therefore, the manufacturing device of the present invention has the industrial applicability.

What is claimed is:

1. A magnetic head slider manufacturing method, comprising: a stacked-layer forming step which stacks, on a substrate, magnetic heads each including a reproducing element and a recording element; a lapping step which cuts out a bar block having a plurality of connected magnetic head sliders containing the magnetic heads, and polishes a flying surface where the reproducing element and the recording element are exposed; and a slider cutting step which cuts out individual magnetic head sliders from the bar block, wherein:

the stacked-layer forming step forms a reproducing-element polish amount detecting sensor whose output value changes by being polished on a same layer as that of the reproducing element, and forms a recording-element polish amount detecting sensor whose output value changes by being polished on a same layer as that of the recording element so as to form the recording-element polish amount detecting sensor and/or the reproducing-element polish amount detecting sensor substantially in a ladder form which includes a plurality of band-like parts extended perpendicularly to a polishing direction provided at a prescribed interval and includes a pair of connection parts for connecting end parts of the plurality of band-like parts with each other; and the lapping step carries out polishing based on each output value of the reproducing-element polish amount detecting sensor and the recording-element polish amount detecting sensor.

2. The magnetic head slider manufacturing method according to claim 1, wherein the stacked-layer forming step forms the recording-element polish amount detecting sensor in a form in accordance with a length of the recording element.

3. The magnetic head slider manufacturing method according to claim 1, wherein the stacked-layer forming step shapes forms of the recording element and the recording-element polish amount detecting sensor simultaneously.

4. The magnetic head slider manufacturing method according to claim 3, wherein the stacked-layer forming step shapes the forms of the recording element and the recording-element polish amount detecting sensor by etching or milling.

5. The magnetic head slider manufacturing method according to claim 1, wherein the stacked-layer forming step forms the recording-element polish amount detecting sensor and the reproducing-element polish amount detecting sensor by aligning relative positions of an end part of the recording-element polish amount detecting sensor and an end part of the reproducing-element polish amount detecting sensor positioned on a flying surface side of the magnetic head slider with respect to a polishing direction.

6. The magnetic head slider manufacturing method according to claim 5, wherein the stacked-layer forming step forms the recording-element polish amount detecting sensor by aligning a shaping-target position of the end part of the recording-element polish amount detecting sensor to the position of the end part of the reproducing-element polish amount detecting sensor in the polishing direction.

7. The magnetic head slider manufacturing method according to claim 5, wherein the stacked-layer forming step forms the recording-element polish amount detecting sensor by setting a shaping-target form of the recording-element polish amount detecting sensor as almost a same form as that of the reproducing-element polish amount detecting sensor.

8. The magnetic head slider manufacturing method according to claim 1, wherein the stacked-layer forming step forms the recording-element polish amount detecting sensor in the form including the plurality of band-like parts, and forms a larger number of the band-like parts on the flying surface side.

9. The magnetic head slider manufacturing method according to claim 1, wherein the stacked-layer forming step stacks the reproducing-element polish amount detecting sensor and the recording-element polish amount detecting sensor by electrically connecting one of output terminals of the reproducing-element polish amount detecting sensor and one of output terminals of the recording-element polish amount detecting sensor to the substrate side, and electrically connecting other output terminal of the reproducing-element polish amount detecting sensor and other output terminal of the recording-element polish amount detecting sensor to prescribed terminal parts that are provided on a top layer when forming stacked-layers.

10. The magnetic head slider manufacturing method according to claim 9, wherein the stacked-layer forming step stacks the reproducing-element polish amount detecting sensor and the recording-element polish amount detecting sensor by electrically connecting the other output terminals of the reproducing-element polish amount detecting sensor and the recording-element polish amount detecting sensor, respectively, to the terminal provided for inputting a prescribed signal to the magnetic head, and to the terminal part that is not connected to the magnetic head.

11. The magnetic head slider manufacturing method according to claim 10, wherein the slider cutting step cuts out the magnetic head slider from the bar block in such a manner that the magnetic head slider does not contain the terminal part that is not connected to the magnetic head to which the other output terminal of the reproducing-element polish amount detecting sensor or the other output terminal of the recording-element polish amount detecting sensor is connected.

12. The magnetic head slider manufacturing method according to claim 1, wherein the slider cutting step cuts out the magnetic head slider from the bar block in such a manner that the magnetic head slider does not contain the reproducing-element polish amount detecting sensor and the recording-element polish amount detecting sensor.

13. The magnetic head slider manufacturing method according to claim 1, wherein the lapping step performs polishing by adjusting an polishing angle of the bar block based on the output values of the reproducing-element polish amount detecting sensor and the recording-element polish amount detecting sensor.

14. The magnetic head slider manufacturing method according to claim 13, wherein the lapping step comprises: a sensor output value detecting step which detects the output values of the reproducing-element polish amount detecting sensor and the recording-element polish amount detecting sensor while polishing the bar block; a polishing-angle setting step which sets the polishing angle of the bar block in accordance with the detected output values; and a length-adjusting polishing step which polishes the bar block so that the reproducing element and the recording element come to be in desired lengths.

15. The magnetic head slider manufacturing method according to claim 1, wherein:
the stacked-layer forming step forms a pair of polishing-end detecting sensors whose output values change, respectively, when the recording element is polished, in such a manner that the output values of the respective polishing-end detecting sensors coincide with each other with a prescribed polishing amount; and
the lapping step stops the polishing when the output values of the respective polishing-end detecting sensors come under a state considered as consistent with each other according to a criterion set in advance.

16. The magnetic head slider manufacturing method according to claim 15, wherein the stacked-layer forming step forms at least one of the pair of polishing-end detecting sensors substantially in a ladder form which includes a plurality of band-like parts extended perpendicularly to a polishing direction provided at a prescribed interval and includes a pair of connection parts for connecting end parts of the plurality of band-like parts with each other.

17. The magnetic head slider manufacturing method according to claim 16, wherein the stacked-layer forming step forms each of the pair of polishing-end detecting sensors substantially in the ladder form in such a manner that positions of the band-like parts in the polishing direction of the respective polishing-end detecting sensors come to be different between each of the polishing-end detecting sensors.

18. The magnetic head slider manufacturing method according to claim 15, wherein the stacked-layer forming step forms the recording-element polish amount detecting sensor as one of the pair of polishing-end detecting sensors.

19. A magnetic head slider manufacturing method, comprising: a stacked-layer forming step which stacks, on a substrate, magnetic heads each including a reproducing element and a recording element; a lapping step which cuts out a bar block having a plurality of connected magnetic head sliders containing the magnetic heads, and polishes a flying surface where the reproducing element and the recording element are exposed; and a slider cutting step which cuts out individual magnetic head sliders from the bar block, wherein:
the stacked-layer forming step forms a reproducing-element polish amount detecting sensor whose output value changes by being polished on a same layer as that of the reproducing element, and forms a recording-element polish amount detecting sensor whose output value changes by being polished on a same layer as that of the recording element and stacks the reproducing-element polish amount detecting sensor and the recording-element polish amount detecting sensor by electrically connecting one of output terminals of the reproducing-element polish amount detecting sensor and one of output terminals of the recording-element polish amount detecting sensor to the substrate side, and electrically connecting other output terminal of the reproducing-element polish amount detecting sensor and other output terminal of the recording-element polish amount detecting sensor to prescribed terminal parts that are provided on a top layer when forming stacked-layers; and
the lapping step carries out polishing based on each output value of the reproducing-element polish amount detecting sensor and the recording-element polish amount detecting sensor.

20. The magnetic head slider manufacturing method according to claim 19, wherein the stacked-layer forming step stacks the reproducing-element polish amount detecting sensor and the recording-element polish amount detecting sensor by electrically connecting the other output terminals of the reproducing-element polish amount detecting sensor and the recording-element polish amount detecting sensor, respectively, to the terminal provided for inputting a prescribed signal to the magnetic head, and to the terminal part that is not connected to the magnetic head.

21. The magnetic head slider manufacturing method according to claim 20, wherein the slider cutting step cuts out the magnetic head slider from the bar block in such a manner that the magnetic head slider does not contain the terminal part that is not connected to the magnetic head to which the other output terminal of the reproducing-element polish amount detecting sensor or the other output terminal of the recording-element polish amount detecting sensor is connected.

22. A magnetic head slider manufacturing method, comprising: a stacked-layer forming step which stacks, on a substrate, magnetic heads each including a reproducing element and a recording element; a lapping step which cuts out a bar block having a plurality of connected magnetic head sliders containing the magnetic heads, and polishes a flying surface where the reproducing element and the recording element are exposed; and a slider cutting step which cuts out individual magnetic head sliders from the bar block, wherein:
the stacked-layer forming step forms a reproducing-element polish amount detecting sensor whose output value changes by being polished on a same layer as that of the reproducing element, and forms a recording-element polish amount detecting sensor whose output value changes by being polished on a same layer as that of the recording element and also forms a pair of polishing-end detecting sensors whose output values change, respectively, when the recording element is polished, in such a manner that the output values of the respective polishing-end detecting sensors coincide with each other with a prescribed polishing amount, and forms at least one of the pair of polishing-end detecting sensors substantially in a ladder form which includes a plurality of band-like parts extended perpendicularly to a polishing direction provided at a prescribed interval and includes a pair of connection parts for connecting end parts of the plurality of band-like parts with each other; and
the lapping step carries out polishing based on each output value of the reproducing-element polish amount detecting sensor and the recording-element polish amount detecting sensor, wherein the lapping step stops the polishing when the output values of the respective polishing-end detecting sensors come under a state considered as consistent with each other according to a criterion set in advance.

23. The magnetic head slider manufacturing method according to claim 22, wherein the stacked-layer forming step forms each of the pair of polishing-end detecting sensors substantially in the ladder form in such a manner that positions of the band-like parts in the polishing direction of the respective polishing-end detecting sensors come to be different between each of the polishing-end detecting sensors.

24. The magnetic head slider manufacturing method according to claim 22, wherein the stacked-layer forming step forms the recording-element polish amount detecting sensor as one of the pair of polishing-end detecting sensors.

* * * * *